US012683717B2

(12) United States Patent
Yang et al.

(10) Patent No.:   US 12,683,717 B2
(45) Date of Patent:       Jul. 14, 2026

(54) COMMUNICATION METHOD AND APPARATUS

(71) Applicant: Huawei Technologies Co., Ltd., Shenzhen (CN)

(72) Inventors: Ruonan Yang, Hangzhou (CN); Ying Chen, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 295 days.

(21) Appl. No.: 18/650,532

(22) Filed: Apr. 30, 2024

(65) Prior Publication Data

US 2024/0305412 A1      Sep. 12, 2024

Related U.S. Application Data

(63) Continuation of application No. PCT/CN2022/123860, filed on Oct. 8, 2022.

(30) Foreign Application Priority Data

Nov. 4, 2021     (CN) .......................... 202111301029.X

(51) Int. Cl.
| | |
|---|---|
| *H04L 1/1812* | (2023.01) |
| *H04W 72/0446* | (2023.01) |
| *H04W 72/1273* | (2023.01) |
| *H04W 72/231* | (2023.01) |

(52) U.S. Cl.
CPC ....... *H04L 1/1812* (2013.01); *H04W 72/0446* (2013.01); *H04W 72/1273* (2013.01); *H04W 72/231* (2023.01)

(58) Field of Classification Search
CPC ... H04L 1/1812; H04L 1/1854; H04L 1/1896; H04L 1/1822; H04L 5/00; H04L 5/0055; H04L 1/1864; H04W 72/0446; H04W 72/1273; H04W 72/231
See application file for complete search history.

(56) References Cited

U.S. PATENT DOCUMENTS

| | | | |
|---|---|---|---|
| 2021/0288756 A1* | 9/2021 | Shrestha ............... | H04L 1/1812 |
| 2022/0330298 A1* | 10/2022 | Cheng ................... | H04L 1/1864 |
| 2024/0292413 A1* | 8/2024 | Jiang ................ | H04W 72/1273 |

OTHER PUBLICATIONS

3GPP TSG RAN WG1 #106bis-e R1-2109933, "Discussion on HARQ enhancements for NTN", ITL, e-Meeting, Oct. 11-19, 2021, total 6 pages.

* cited by examiner

*Primary Examiner* — Vinncelas Louis
(74) *Attorney, Agent, or Firm* — Slater Matsil, LLP

(57) ABSTRACT

A terminal device determines N1 HARQ feedback disabling processes corresponding to a first uplink feedback slot, where N1 is a positive integer; and the terminal device determines, based on N1 pieces of DCI corresponding to the N1 HARQ feedback disabling processes, whether to perform HARQ feedback in the first uplink feedback slot, where the N1 HARQ feedback disabling processes one-to-one correspond to the N1 pieces of DCI. The terminal device determines, based on the N1 pieces of DCI corresponding to the N1 HARQ feedback disabling processes, whether to perform HARQ feedback in the first uplink feedback slot, so that the terminal device can determine, in a HARQ feedback disabling mechanism, whether to perform HARQ feedback.

19 Claims, 7 Drawing Sheets

101

102

201

Satellite 202    202

COMMUNICATION METHOD AND APPARATUS

CROSS-REFERENCE TO RELATED APPLICATIONS

This application is a continuation of International Application No. PCT/CN2022/123860, filed on Oct. 8, 2022, which claims priority to Chinese Patent Application No. 202111301029.X, filed on Nov. 4, 2021. The disclosures of the aforementioned applications are hereby incorporated by reference in their entireties.

TECHNICAL FIELD

Embodiments of this application relate to the field of communication technologies, and in particular, to a communication method and apparatus.

BACKGROUND

Reliability of data transmission is an important performance index in a communication system. In the communication system, a network device sends data to a terminal device by using a physical downlink shared channel (PDSCH), and the terminal device usually feeds back hybrid automatic repeat request (HARQ) information to the network device. The HARQ information may also be referred to as HARQ feedback information or HARQ-acknowledgment (ACK) information. The network device determines, based on the HARQ feedback information sent by the terminal device, whether the data is successfully transmitted, thereby improving reliability of data transmission. A stop-and-wait protocol is used in HARQ to send data. In the stop-and-wait protocol, after sending a transport block (TB), a transmitting end stops and waits for acknowledgment information. A receiving end performs ACK feedback or NACK feedback on the TB by using 1-bit information. However, the transmitting end stops and waits for an acknowledgment after each transmission, resulting in very low throughput. Therefore, a plurality of parallel HARQ processes may be used. When one HARQ process waits for an acknowledgment, the transmitting end may continue to send data by using another HARQ process.

Currently, in some scenarios such as NTN, a HARQ feedback disabling mechanism is introduced. A HARQ feedback disabling process does not need to be fed back, and only a HARQ feedback enabling process needs to be fed back. If the network device sends downlink control information (DCI) for data scheduling and corresponding data on a HARQ feedback enabling process, and the terminal device misses detection of the DCI on the HARQ feedback enabling process and does not correctly receive the data, the terminal device does not need to send HARQ feedback to the network device even if the terminal device receives data on a HARQ feedback disabling process. As a result, behavior understanding of the terminal device is inconsistent with that of the network device.

In conclusion, in a scenario of the HARQ feedback disabling mechanism, how to determine whether to perform HARQ feedback is a problem that needs to be resolved.

SUMMARY

Embodiments of this application provide a communication method and apparatus, to resolve a problem of how to determine whether to perform HARQ feedback in a scenario of a HARQ feedback disabling mechanism.

According to a first aspect, a communication method is provided. The method may be performed by a terminal device, or may be performed by a chip used in the terminal device. Descriptions are provided below by using an example in which the method is performed by the terminal device. The method may be implemented by using the following steps: The terminal device determines N1 HARQ feedback disabling processes corresponding to a first uplink feedback slot, where N1 is a positive integer; and the terminal device determines, based on N1 pieces of DCI corresponding to the N1 HARQ feedback disabling processes, whether to perform HARQ feedback in the first uplink feedback slot, where the N1 HARQ feedback disabling processes one-to-one correspond to the N1 pieces of DCI. The terminal device determines, based on the N1 pieces of DCI corresponding to the N1 HARQ feedback disabling processes, whether to perform HARQ feedback in the first uplink feedback slot, so that the terminal device can determine, in a HARQ feedback disabling mechanism, whether to perform HARQ feedback.

In a possible design, that the terminal device determines, based on N1 pieces of downlink control information DCI corresponding to the N1 HARQ feedback disabling processes, whether to perform HARQ feedback in the first uplink feedback slot may be implemented in the following manner: When a first field in each of the N1 pieces of DCI is a first value, the terminal device determines not to perform HARQ feedback in the first uplink feedback slot. When all the first fields are set to the first value, the terminal device determines to perform HARQ feedback. This ensures that the terminal device and the network device have consistent understanding, thereby avoiding a decoding failure of the network device. Optionally, when the terminal device does not receive data of a HARQ feedback enabling process, and the first field in each of the N1 pieces of DCI is the first value, the terminal device determines not to perform HARQ feedback in the first uplink feedback slot.

In a possible design, that the terminal device determines, based on N1 pieces of downlink control information DCI corresponding to the N1 HARQ feedback disabling processes, whether to perform HARQ feedback in the first uplink feedback slot may be implemented in the following manner: When a first field in one or more of the N1 pieces of DCI is not a first value, the terminal device determines to perform HARQ feedback in the first uplink feedback slot. When the first field in the one or more of the N1 pieces of DCI is not the first value, the terminal device determines not to perform HARQ feedback. This ensures that the terminal device and the network device have consistent understanding, thereby avoiding a decoding failure of the network device. Optionally, when the terminal device does not receive data of a HARQ feedback enabling process, and the first field in the one or more of the N1 pieces of DCI is not the first value, the terminal device determines to perform HARQ feedback in the first uplink feedback slot.

When the first field in the one or more of the N1 pieces of DCI is not the first value, the terminal device determines to perform HARQ feedback in the first uplink feedback slot. Based on this, optionally, if all received data is on HARQ feedback disabling processes, the terminal device determines a size of a HARQ codebook based on a sum of change amplitudes of DAI fields in the N1 pieces of DCI.

Optionally, the terminal device performs HARQ feedback in the first uplink feedback slot based on the size of the HARQ codebook.

In a possible design, the N1 pieces of DCI indicate a quantity N2 of HARQ feedback enabling processes corresponding to the first uplink feedback slot, where N2 is a non-negative integer. When the first field in each of the N1 pieces of DCI is the first value, it indicates that N2 is 0; or when the first field in the one or more of the N1 pieces of DCI is not the first value, it indicates that N2 is greater than 0.

In a possible design, the first field includes one or more of the following fields: new data indicator (new data indicator, NDI), redundancy version (RV), transmit power control (TPC) command for scheduled PUCCH, PUCCH resource indicator, PDSCH-to-HARQ feedback timing indicator, or DAI. In this way, whether the terminal device misses detection can be more clearly indicated. When HARQ feedback is disabled, the foregoing field in the original DCI is no longer meaningful. If the field is deleted, a size of the DCI is changed. As a result, the terminal device needs to listen for DCI of a plurality of sizes, which increases complexity of blind detection. A meaning of the field is re-interpreted, to indicate whether the terminal device configures all HARQ feedback disabling processes on all PDCCH detection opportunities. As long as the terminal device receives DCI corresponding to one HARQ feedback disabling process, the terminal device may know, by using the foregoing field in the DCI, whether a HARQ feedback enabling process is configured on a PDCCH detection opportunity. In this way, determining of the terminal device on missed detection is improved, and efficiency of data transmission is further improved.

Optionally, the first field is a downlink assignment index DAI field, and the first value is 1 for all bits. This can help the terminal device determine whether missed DCI detection occurs on a HARQ feedback enabling process.

In a possible design, if data is received on a HARQ feedback enabling process, or if DCI is detected on a HARQ feedback enabling process, or if a quantity of HARQes corresponding to received DCI is not 0, and data is received only on a first HARQ feedback disabling process on a last occasion for candidate PDSCH reception that is corresponding to the first uplink feedback slot, the terminal device compares whether a value of a DAI received on the first HARQ feedback disabling process is the same as a value of a DAI received on a first HARQ feedback enabling process. If the values are different, the terminal device determines, based on the value of the DAI received on the first HARQ feedback disabling process, the size of the HARQ codebook used for performing HARQ feedback in the first uplink feedback slot. The first HARQ feedback enabling process is a last HARQ feedback enabling process on which data is received. If the terminal device receives only a HARQ feedback disabling process on the last occasion for PDSCH reception, the terminal device needs to determine the size of the HARQ codebook according to a DAI value of the HARQ feedback disabling process and a DAI value of the last HARQ feedback enabling process. If a last piece of data on all occasions for PDSCH reception is data on a HARQ feedback enabling process, the terminal device may determine the size of the HARQ codebook according to a DAI value of the HARQ feedback enabling process. In this way, accuracy of determining the size of the HARQ codebook can be improved.

According to a second aspect, a communication method is provided. The method may be performed by a network device, or may be performed by a chip used in the network device. Descriptions are provided below by using an example in which the method is performed by the network device. The method may be implemented by using the following steps: The network device determines M hybrid automatic repeat request HARQ feedback disabling processes corresponding to a first uplink feedback slot, where M is a positive integer; and the network device configures M pieces of downlink control information DCI corresponding to the M HARQ feedback disabling processes, where the M pieces of DCI indicate whether to perform HARQ feedback in the first uplink feedback slot, and the M HARQ feedback disabling processes one-to-one correspond to the M pieces of DCI. A terminal device receives data on N1 HARQ feedback disabling processes corresponding to the first uplink feedback slot, where the N1 HARQ feedback disabling processes are included in the M HARQ feedback disabling processes, and N1 is less than or equal to M. When N1 is equal to M, the terminal device receives all the M HARQ feedback disabling processes sent by the network device. When N1 is less than M, the terminal device receives only some of the M HARQ feedback disabling processes sent by the network device.

In a possible design, that the network device configures M pieces of DCI corresponding to the M HARQ feedback disabling processes may be implemented in the following manner: If a quantity N2 of HARQ feedback enabling processes corresponding to the first uplink feedback slot is 0, the network device sets a first field in each of the M pieces of DCI to a first value; or if a quantity N2 of HARQ feedback enabling processes corresponding to the first uplink feedback slot is 0, the network device sets a first field in one or more of the M pieces of DCI to be not a first value.

In a possible design, the first field in each of the M pieces of DCI is the first value, and is used to indicate the terminal device not to perform HARQ feedback in the first uplink feedback slot; and the first field in the one or more of the M pieces of DCI is not the first value, and indicates the terminal device to perform HARQ feedback in the first uplink feedback slot.

In a possible design, the first field is a downlink assignment index DAI field, and the first value is 1 for all bits.

In a possible design, the first field includes one or more of the following fields: new data indicator NDI, redundancy version RV, transmit power control command for scheduled physical uplink control channel PUCCH, PUCCH resource indicator, physical downlink shared channel PDSCH to HARQ feedback timing indicator, or DAI.

In the second aspect, for beneficial effects brought by a design of a first field in the M pieces of DCI, refer to the effects of a design of a first field in the N1 pieces of DCI in the first aspect. For possible designs of the second aspect, refer to descriptions of corresponding parts in the first aspect. Details are not described herein again.

According to a third aspect, a communication apparatus is provided. The apparatus may be a terminal device, or may be a component (for example, a chip, a chip system, or a circuit) located in the terminal device. The apparatus has a function of implementing the method in the first aspect or any one of the possible designs of the first aspect. The function may be implemented by hardware, or may be implemented by executing corresponding software by hardware. The hardware or software includes one or more modules corresponding to the foregoing function. In a design, the apparatus may include a determining unit and a feedback unit. For example, the determining unit is configured to determine N1 hybrid automatic repeat request HARQ feedback disabling processes corresponding to a first uplink feedback slot, where N1 is a positive integer; and the feedback unit is configured to determine, based on N1 downlink control information DCI corresponding to the N1 HARQ feedback disabling processes, whether to perform HARQ feedback in the first uplink feedback slot, where the N1 HARQ feedback disabling processes one-to-one correspond to the N1 pieces of DCI. For more detailed descriptions of the determining unit and the feedback unit, refer to related descriptions in the first aspect. For beneficial effects of the third aspect and the possible designs, refer to descriptions of corresponding parts in the first aspect.

According to a fourth aspect, a communication apparatus is provided. The apparatus may be a network device, or may be a component (for example, a chip, a chip system, or a circuit) located in the network device. The apparatus has a function of implementing the method in the second aspect or any one of the possible designs of the second aspect. The function may be implemented by hardware, or may be implemented by executing corresponding software by hardware. The hardware or software includes one or more modules corresponding to the foregoing function. In a design, the apparatus may include a determining unit and a configuration unit. For example, the determining unit is configured to determine M hybrid automatic repeat request HARQ feedback disabling processes corresponding to a first uplink feedback slot, where M is a positive integer; and the configuration unit is configured to configure M pieces of downlink control information DCI corresponding to the M HARQ feedback disabling processes, where the M pieces of DCI indicate whether to perform HARQ feedback in the first uplink feedback slot, and the M HARQ feedback disabling processes one-to-one correspond to the M pieces of DCI. For more detailed descriptions of the determining unit and the configuration unit, refer to related descriptions in the second aspect. For beneficial effects of the fourth aspect and the possible designs, refer to descriptions of corresponding parts in the second aspect.

According to a fifth aspect, an embodiment of this application provides a communication apparatus. The communication apparatus includes an interface circuit and a processor, and the processor and the interface circuit are coupled to each other. The processor is configured to implement, by using a logic circuit or executing a code instruction, the method described in the first aspect or the possible designs of the first aspect. The interface circuit is configured to receive a signal from another communication apparatus other than the communication apparatus, and transmit the signal to the processor, or send a signal from the processor to another communication apparatus other than the communication apparatus. It may be understood that the interface circuit may be a transceiver or an input/output interface.

Optionally, the communication apparatus may further include a memory, configured to: store instructions executed by the processor, or store input data required for running instructions by the processor, or store data generated after the processor runs instructions. The memory may be a physically independent unit, or may be coupled to the processor, or the processor includes the memory.

According to a sixth aspect, an embodiment of this application provides a communication apparatus. The communication apparatus includes an interface circuit and a processor, and the processor and the interface circuit are coupled to each other. The processor is configured to implement, by using a logic circuit or executing a code instruction, the method described in the second aspect or the possible designs of the second aspect. The interface circuit is configured to receive a signal from another communication apparatus other than the communication apparatus, and transmit the signal to the processor, or send a signal from the processor to another communication apparatus other than the communication apparatus. It may be understood that the interface circuit may be a transceiver or an input/output interface.

Optionally, the communication apparatus may further include a memory, configured to: store instructions executed by the processor, or store input data required for running instructions by the processor, or store data generated after the processor runs instructions. The memory may be a physically independent unit, or may be coupled to the processor, or the processor includes the memory.

According to a seventh aspect, an embodiment of this application provides a computer-readable storage medium, where the computer-readable storage medium stores a computer program or a readable instruction, and when the computer program or the readable instruction is executed by a communication apparatus, the methods in the foregoing aspects or the possible designs of the aspects are performed.

According to an eighth aspect, an embodiment of this application provides a chip system. The chip system includes a processor, and may further include a memory. The memory is configured to store a program, instructions, or code. The processor is configured to execute the program, the instruction, or the code stored in the memory, to implement the methods in the foregoing aspects or the possible designs of the foregoing aspects. The chip system may include a chip, or may include a chip and another discrete component.

According to a ninth aspect, a computer program product including instructions is provided. When the computer program product is executed by a communication apparatus, the methods in the foregoing aspects or the possible designs of the foregoing aspects are performed.

BRIEF DESCRIPTIONS OF THE DRAWINGS

Figures 5A, 5B:
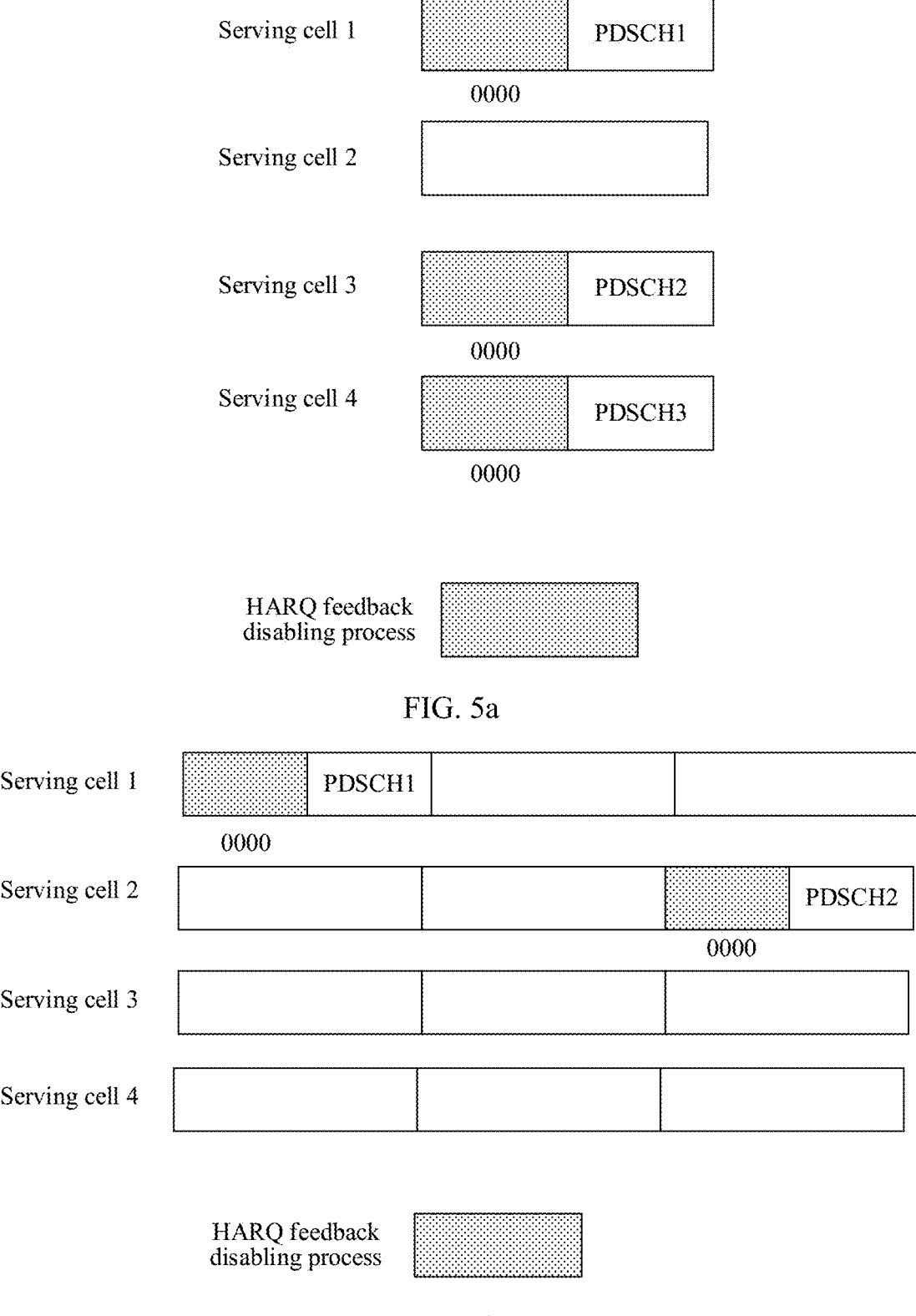
Figure 6A:
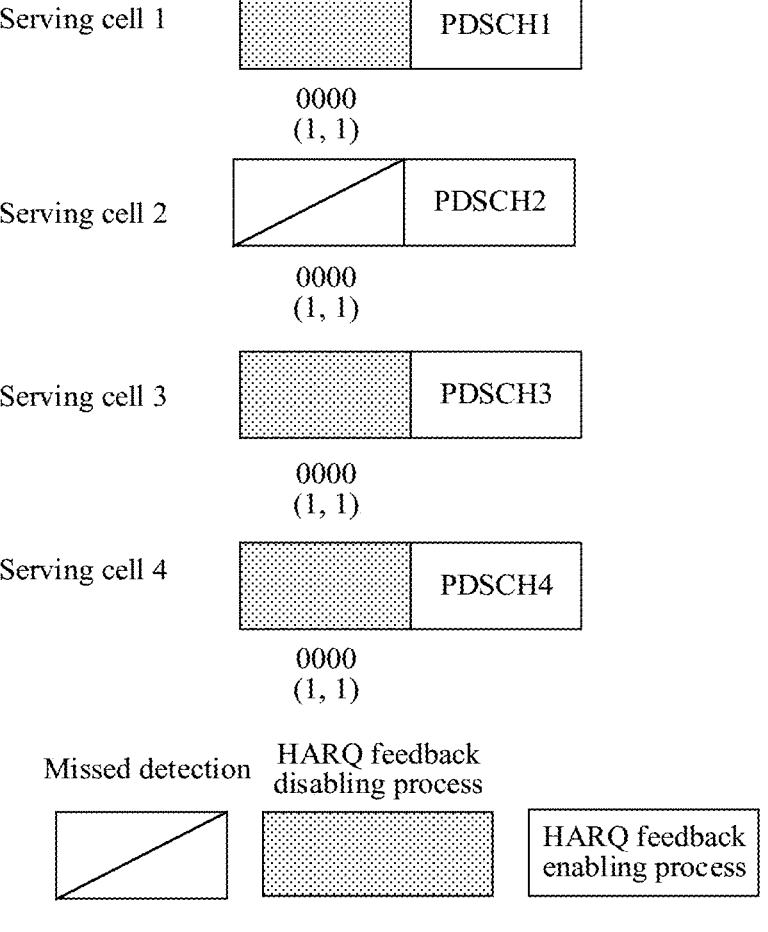
Figure 6B:
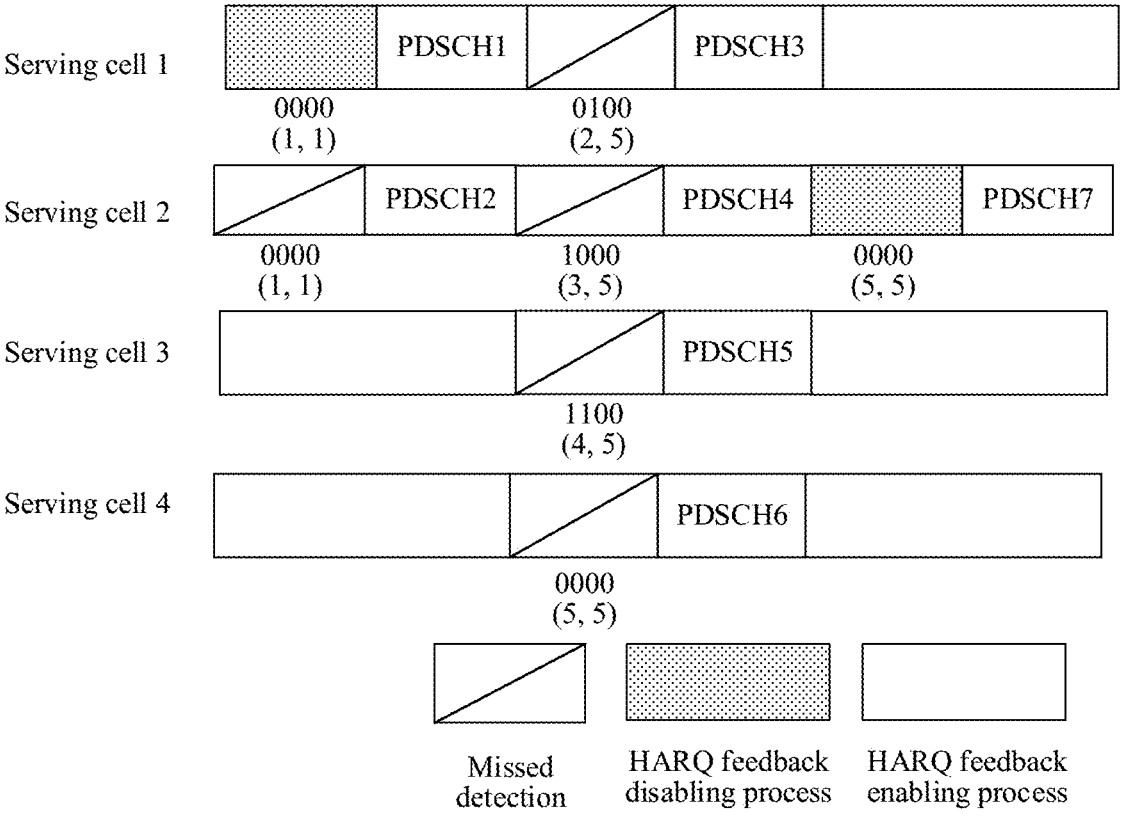
Figure 7:
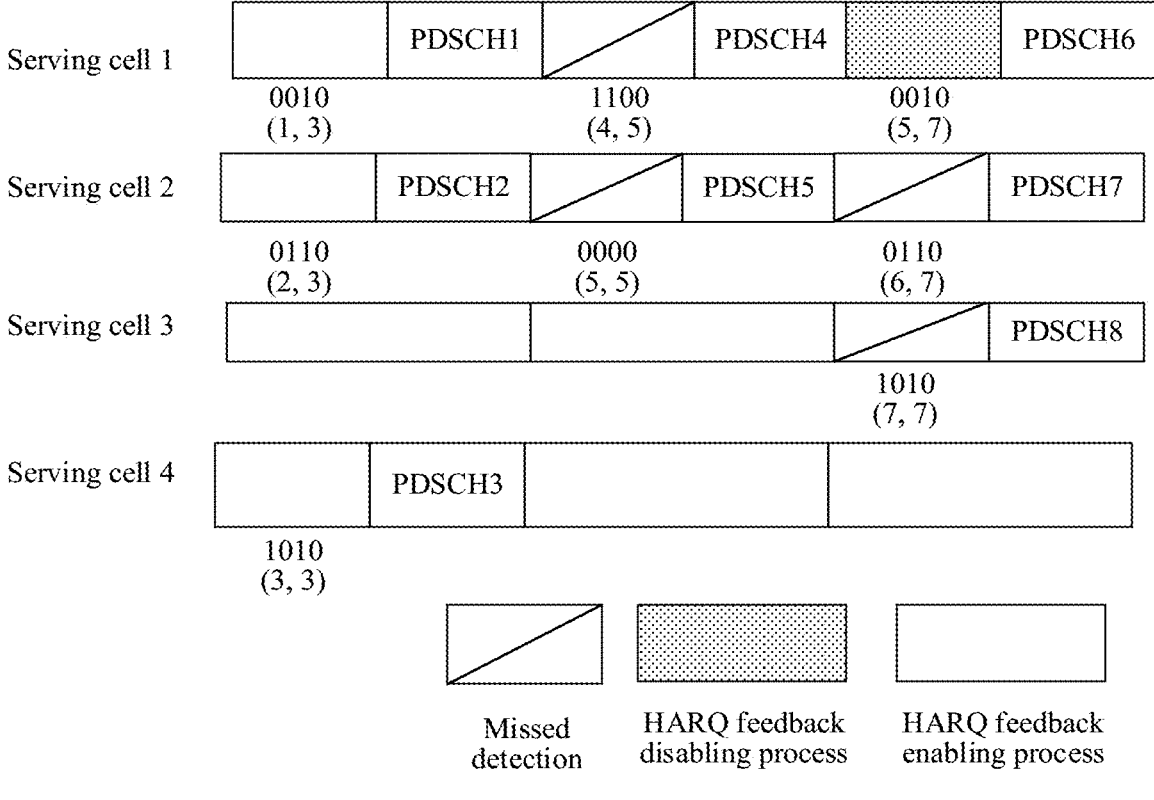
Figure 8:
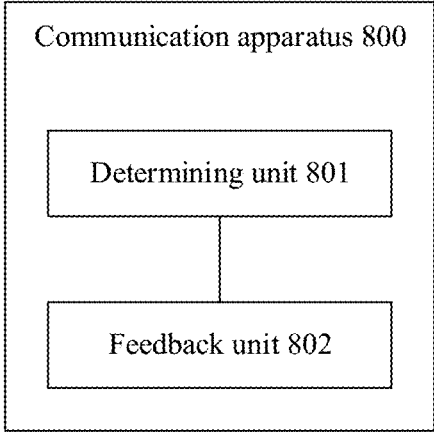
Figure 9:
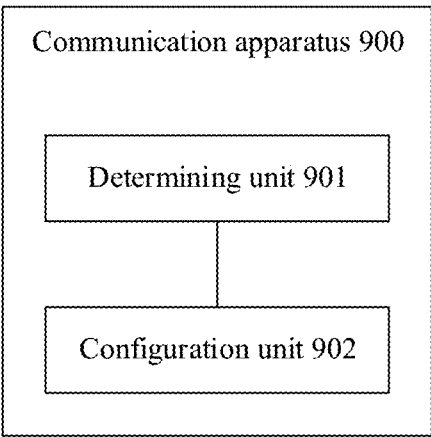
Figure 10:
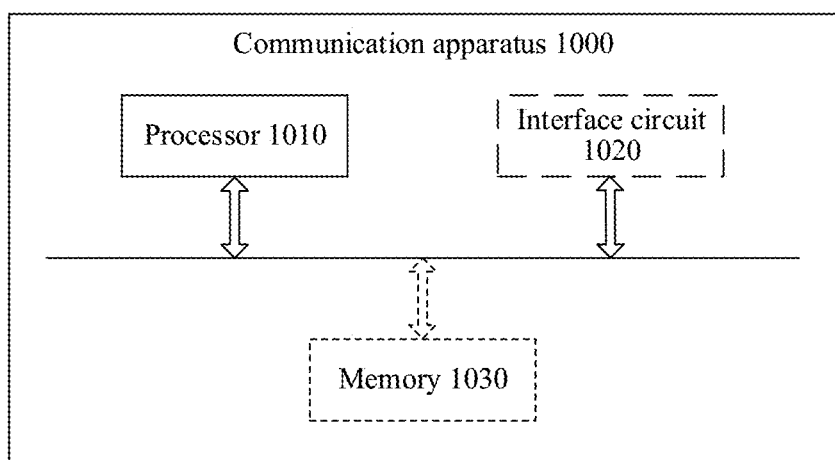

FIG. 5*a* is a schematic diagram 1 of DCI configuration according to an embodiment of this application;

FIG. 5*b* is a schematic diagram 2 of DCI configuration according to an embodiment of this application;

FIG. 6*a* is a schematic diagram 1 of detecting DCI by a terminal device according to an embodiment of this application;

FIG. 6*b* is a schematic diagram 2 of detecting DCI by a terminal device according to an embodiment of this application;

FIG. 7 is a schematic diagram of determining a dynamic codebook based on a DAI value according to an embodiment of this application;

FIG. 8 is a schematic diagram 1 of a structure of a communication apparatus according to an embodiment of this application;

FIG. 9 is a schematic diagram 2 of a structure of a communication apparatus according to an embodiment of this application; and FIG. 10 is a schematic diagram 3 of a structure of a communication apparatus according to an embodiment of this application.

DETAILED DESCRIPTIONS OF ILLUSTRATIVE EMBODIMENTS

Embodiments of this application provide a communication method and an apparatus. The method and the apparatus are based on a same technical concept or are based on a similar technical concept. Because problem-resolving principles of the method and the apparatus are similar, mutual reference may be made to implementations of the apparatus and the method. Repeated parts are not described again.

In descriptions of embodiments of this application, the term "and/or" describes an association relationship between associated objects and indicates that three relationships may exist. For example, A and/or B may indicate the following three cases: Only A exists, both A and B exist, and only B exists. In this application, "a plurality of" means two or more. In addition, it should be understood that in descriptions of this application, terms such as "first" and "second" are merely used for distinguishing and descriptions, but should not be understood as indicating or implying relative importance, or should not be understood as indicating or implying a sequence.

The following describes in detail embodiments of this application with reference to accompanying drawings.

The communication method provided in embodiments of this application may be applied to a 4th generation (4G) communication system, for example, long term evolution (LTE), or may be applied to a 5th generation (5G) communication system, for example, 5G new radio (NR), or may be applied to various future evolved communication systems, for example, a 6th generation (6G) communication system, or a space-air-sea-ground integrated communication system. The method provided in embodiments of this application may be applied to a terrestrial network communication system, or may be applied to a non-terrestrial network (NTN) communication system. The NTN communication system may be, for example, a satellite communication system.

Figure 1:
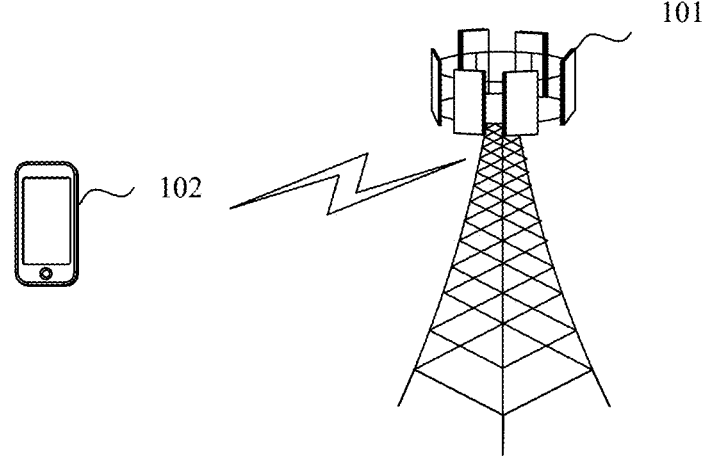
FIG. 1 is a schematic diagram of an architecture of a communication system according to an embodiment of this application.

FIG. 1 shows an architecture of a communication system to which an embodiment of this application is applicable. As shown in FIG. 1, the communication system includes a network device 101 and a terminal device 102.

First, possible implementation forms and functions of the network device 101 and the terminal device 102 are described by using an example.

The network device 101 provides a service for the terminal device 102 within coverage. For example, as shown in FIG. 1, the network device 101 provides wireless access for one or more terminal devices 102 within coverage of the network device 101.

The network device 101 is a node in a radio access network (RAN), may also be referred to as a base station, and may further be referred to as a RAN node (or device). Currently, some examples of the network device 101 are: a next generation base station (next generation NodeB, gNB), a next generation evolved base station (next generation evolved NodeB, Ng-eNB), a transmission reception point (transmission reception point, TRP), an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), or a wireless fidelity (Wi-Fi) access point (AP). Alternatively, the network device 101 may be a module or unit that completes some functions of the base station. For example, the network device 101 may be a central unit (CU), or may be a distributed unit (DU). The CU herein implements functions of the radio resource control protocol and the packet data convergence protocol (PDCP) of the base station, and may further implement functions of the service data adaptation protocol (SDAP). The DU completes functions of a radio link control layer and a medium access control (MAC) layer of the base station, and may further complete some or all of physical layer functions. For specific descriptions of the foregoing protocol layers, refer to technical specifications related to the 3rd generation partnership project (3GPP). The network device 101 may also be a satellite, and the satellite may also be referred to as a high-altitude platform, a high-altitude aircraft, or a satellite base station. Alternatively, the network device 101 may be another device that has a function of the network device. For example, the network device 101 may be alternatively a device that functions as a network device in device-to-device (D2D) communication, vehicle-to-everything, or machine-to-machine (M2M) communication. Alternatively, the network device 101 may be any possible network device in a future communication system. In this embodiment of this application, the function of the network device 101 may alternatively be performed by a module (for example, a chip) in the network device, or may be performed by a control subsystem including the function of the network device. The control subsystem including the function of the network device may be a control center in the foregoing application scenarios such as smart grid, industrial control, intelligent transportation, and smart city.

The terminal device 102 is also referred to as user equipment (UE), a mobile station (MS), a mobile terminal (MT), or the like, and is a device that provides a user with voice and/or data connectivity. For example, the terminal device 102 includes a handheld device or a vehicle-mounted device having a wireless connection function. Currently, the terminal device 102 may be: a mobile phone, a tablet computer, a notebook computer, a palmtop computer, a mobile internet device (MID), a wearable device (such as a smartwatch, a smart band, or a pedometer), a vehicle-mounted device (such as a car, a bicycle, an electric car, an airplane, a ship, a train, or a high-speed rail), a virtual reality (VR) device, an augmented reality (AR) device, a wireless terminal in industrial control, a smart home device (such as a refrigerator, a television, an air conditioner, or a meter), an intelligent robot, a workshop device, a wireless terminal in self driving, a wireless terminal in remote medical surgery, a wireless terminal in a smart grid, a wireless terminal in transportation safety, a wireless terminal in a smart city, a wireless terminal in a smart home, a flight device (such as an intelligent robot, a hot air balloon, an uncrewed aerial vehicle, or an airplane), or the like. The terminal device 102 may alternatively be another device having a function of the terminal device. For example, the terminal device 102 may alternatively be a device that functions as a terminal device in device-to-device (D2D) communication, vehicle-to-everything communication, or machine-to-machine (M2M) communication. In particular, when communication is performed between network devices, a network device that functions as a terminal device may also be considered as a terminal device. The method provided in embodiments of this application may be performed by a terminal device, or may be performed by a component (for example, a processor, a chip, or a chip system) of the terminal device. An entity that performs the method in embodiments of this application may also be referred to as a communication apparatus. The communication apparatus may be a terminal device or a component (for example, a processor, a chip, or a chip system) of the terminal device.

Based on the descriptions of the architecture of the communication system shown in FIG. 1, the method provided in embodiments of this application may also be applicable to an NTN communication system. In embodiments of this application, a satellite communication system is used as an example of the NTN communication system.

Figure 2:
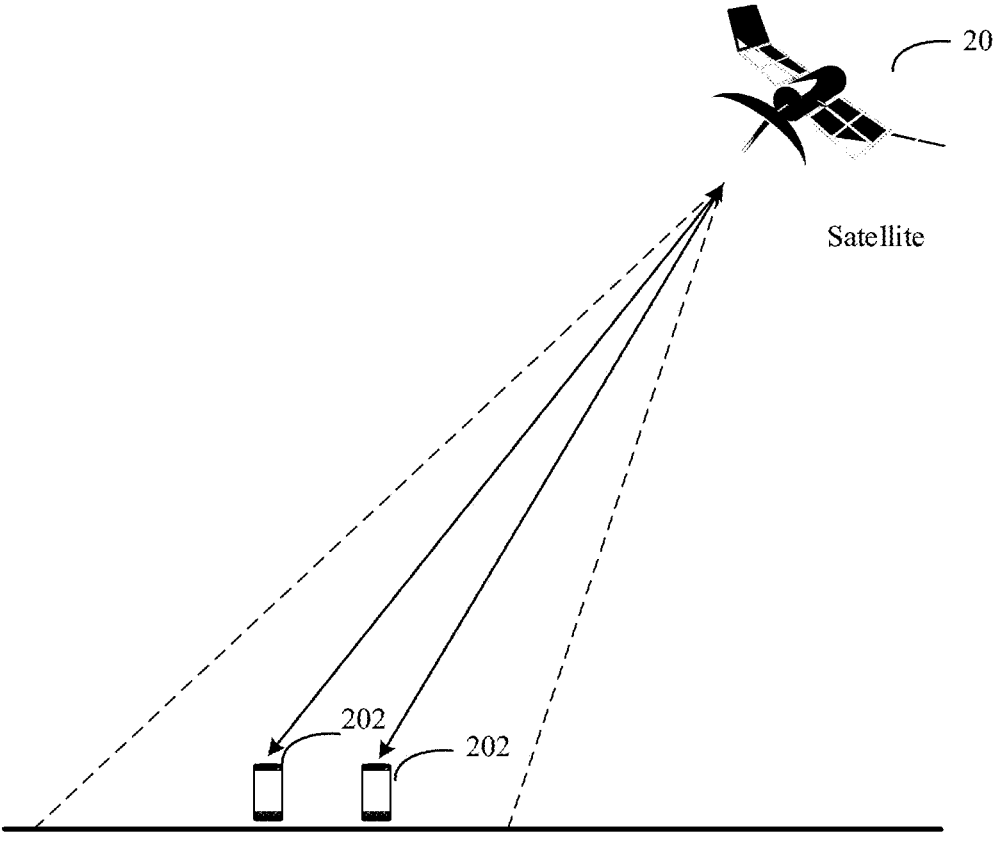
FIG. 2 is a schematic diagram of an architecture of a non-terrestrial network communication system according to an embodiment of this application.

As shown in FIG. 2, the NTN communication system includes a satellite 201 and terminal devices 202. For explanations of the terminal devices 202, refer to related descriptions of the terminal device 102. The satellite 201 may also be referred to as a high-altitude platform, a high-altitude aircraft, or a satellite base station. When the NTN communication system is associated with a terrestrial network communication system, the satellite 201 may be considered as one or more network devices in an architecture of the terrestrial network communication system. The satellite 201 provides a communication service for the terminal devices 202, and the satellite 201 may further be connected to a core network device. For a structure and a function of the satellite 201, refer to the foregoing descriptions of the network device 101. For a communication manner between the satellite 201 and the terminal devices 202, refer to the descriptions in FIG. 1. Details are not described herein again.

Figure 3:
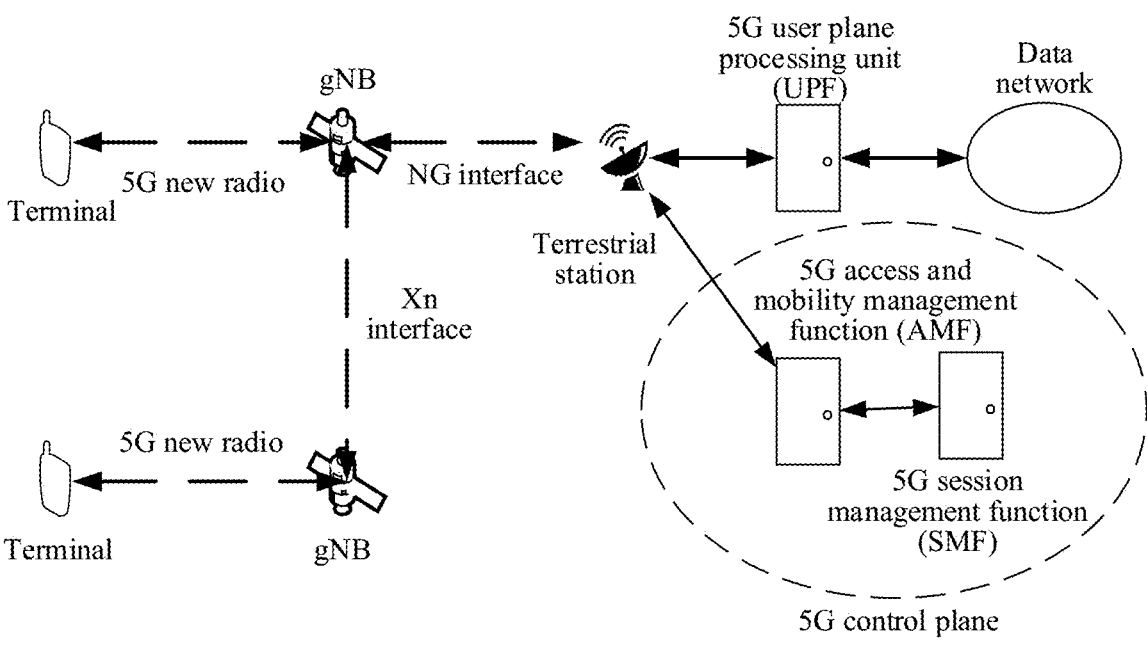
FIG. 3 is a schematic diagram of an architecture of a 5G satellite communication system according to an embodiment of this application.

5G is used as an example. An architecture of a 5G satellite communication system is shown in FIG. 3. A terrestrial terminal device accesses a network through 5G new radio. A gNB is deployed on a satellite, and is connected to a terrestrial core network through a radio link. In addition, a radio link exists between satellites, to perform signaling exchange and user data transmission between base stations. Devices and interfaces in FIG. 3 are described as follows:

A 5G core network provides services such as user access control, mobility management, session management, user security authentication, and accounting. The 5G core network includes a plurality of functional units, which can be classified into control-plane functional entities and data-plane functional entities. An access and mobility management unit (AMF) is responsible for user access management, security authentication, and mobility management. A user plane unit (UPF) is responsible for managing functions such as user plane data transmission and traffic statistics collection.

A terrestrial station is responsible for forwarding signaling and service data between a satellite base station and a 5G core network.

5G new radio: a radio link between a terminal and a base station.

Xn interface: an interface between gNBs, used for signaling exchange such as handover.

NG interface: an interface between a gNB and a 5G core network, used to exchange NAS signaling of the core network and service data of users.

Both the network device in the terrestrial network communication system and the satellite in the NTN communication system are regarded as network devices. An apparatus configured to implement a function of the network device may be a network device or may be an apparatus that can support the network device in implementing the function, for example, a chip system. The apparatus may be installed in the network device. It may be understood that when the method provided in embodiments of this application is applied to the NTN communication system, an action performed by the network device may be applied to the satellite for execution.

In embodiments of this application, an apparatus configured to implement a function of a terminal device may be a terminal device or may be an apparatus that can support the terminal device in implementing the function, for example, a chip system. The apparatus may be installed in the terminal device. In embodiments of this application, a chip system may include a chip, or may include a chip and another discrete component. In the technical solutions provided in embodiments of this application, the following uses an example in which an apparatus configured to implement a function of a terminal device is a terminal device to describe the technical solutions provided in embodiments of this application.

In this application, both a terminal device and a network device may be referred to as communication apparatuses. The terminal device 102 in FIG. 1 and the terminal devices 202 in FIG. 2 may be referred to as communication apparatuses having a function of a terminal device. The network device 101 in FIG. 1 and the satellite 201 in FIG. 2 may be referred to as communication apparatuses having a function of a network device.

To make embodiments of this application clearer, the following briefly describes concepts and some content that are related to embodiments of this application.

1. HARQ Process

HARQ is a method for improving reliability of data transmission. A data packet that is incorrectly decoded is stored in a HARQ buffer, and the data packet that is incorrectly decoded is combined with a subsequently received retransmitted data packet, to obtain a data packet that is more reliable than a data packet that is separately decoded. This process may be referred to as soft combining. The combined data packet is decoded. If the decoding still fails, retransmission is requested, and then a soft combining process is performed.

In HARQ, cyclic redundancy check (CRC) is used to determine whether a received data packet is incorrect. CRC is performed after soft combining. If CRC succeeds, a receiving end sends positive acknowledgment (ACK) feedback. If CRC fails, the receiving end sends negative acknowledgment (NACK) feedback.

A stop-and-wait protocol is used in HARQ to send data. In the stop-and-wait protocol, after sending a transport block (TB), a transmitting end stops and waits for acknowledgment information. The receiving end performs positive (ACK) or negative (NACK) acknowledgment on the TB by using 1-bit information. However, the transmitting end stops and waits for an acknowledgment after each transmission, resulting in very low throughput. Therefore, a plurality of parallel stop-and-wait processes are used, and the stop-and-wait processes may also be referred to as HARQ processes. When waiting for acknowledgment information of one HARQ process, the transmitting end may continue to send data by using another HARQ process, so that data can be continuously transmitted. Each HARQ process requires an independent HARQ buffer at the receiving end, to perform soft combining on received data.

2. HARQ Codebook

A network device sends downlink data to a terminal device on a physical downlink shared channel (PDSCH). After receiving the PDSCH, the terminal device sends HARQ feedback information on the PUSCH or a physical uplink control channel (PUCCH). A slot offset between the PDSCH and the HARQ feedback may be defined as a HARQ feedback timing parameter K1. The network device sends a radio resource control (RRC) parameter "downlink data to uplink ACK (dl-DataToUL-ACK)" to the terminal device, where the RRC parameter indicates a possible value set of K1. The possible value set of K1 may also be predefined. The network device may indicate a K1 value in the K1 set in DCI used for dynamically scheduling the PDSCH. HARQ feedback timing parameters of a plurality of PDSCHs may be indicated to a same uplink feedback slot. In this case, the terminal device may send a HARQ codebook in the uplink feedback slot, and the HARQ codebook includes one or more pieces of HARQ information. One bit in the HARQ codebook may be used to indicate HARQ information of one TB or one HARQ process.

A set of occasions for candidate PDSCH reception corresponding to one uplink feedback slot is fixed. For example, if the uplink feedback slot is no, K1 values in the K1 set may be deduced backwards from the slot no based on the slot no and the K1 set, to obtain K1 slot numbers. An uplink slot in the K1 slot numbers is an occasion for candidate PDSCH reception. In this way, the set of occasions for candidate PDSCH reception is obtained. A size of the HARQ codebook depends mainly on the set of occasions for candidate PDSCH reception. In embodiments of this application, an occasion for candidate PDSCH reception may also be briefly referred to as an occasion for PDSCH reception, and an occasion for candidate PDSCH reception may also be referred to as an occasion for scheduled PDSCH transmission, which is briefly referred to as an occasion for PDSCH transmission. One occasion for candidate PDSCH reception corresponds to one or more time units in time domain, and a time unit may be a slot, a subframe, or a frame. The terminal device detects a PDCCH on an occasion for candidate PDSCH reception. If a plurality of carriers are configured for the terminal device, the terminal device separately detects PDCCH on the plurality of carriers on the occasion for candidate PDSCH reception.

A HARQ semi-persistent codebook feedback mechanism or a HARQ dynamic codebook feedback mechanism is introduced in 5G NR. For the HARQ semi-persistent codebook feedback mechanism, one occasion for candidate PDSCH reception corresponds to at least one bit in a HARQ semi-persistent codebook. For example, if a value of a bit is 1, it indicates an ACK; if a value of a bit is 0, it indicates a NACK. For the HARQ dynamic codebook feedback mechanism, the terminal device may map, to a bit in a HARQ dynamic codebook, HARQ information corresponding to a PDSCH indicated by received DCI. One piece of DCI may correspond to one or more PDSCHs, and one piece of DCI may correspond to one bit or a plurality of bits in the HARQ dynamic codebook.

3. Downlink Assignment Index (DAI)

The network device sends DCI to the terminal device, where the DCI is used to schedule a PDSCH. On a HARQ process, independent DCI may be used to schedule PDSCH transmissions on the HARQ process.

The DCI may include or carry a DAI, and the DAI may be a field in the DCI. The DAI may be used to collect statistics on an accumulated quantity of times. DAI information corresponding to different DCI formats also has different representation forms. A DCI format 1_0 and a DCI format 1_1 each include a C-DAI, and the DCI format 1_1 further includes a T-DAI. A DAI may be defined based on all carriers configured for the terminal device.

A value of a C-DAI may indicate that in a feedback window, statistics are collected first in increasing order of carrier index and then in increasing order of PDCCH monitoring occasion index (first in increasing order of carrier index and then in increasing order of PDCCH monitoring occasion index). In this application, an occasion for candidate PDSCH reception may also be referred to as a PDCCH detection opportunity. The terminal device may determine, by using the C-DAI, a total quantity of scheduled PDSCH transmissions, or a total quantity of PDCCH detection opportunities, or a total quantity of PDCCH transmissions corresponding to DCI used for scheduling PDSCH transmissions until a current carrier and a current PDCCH detection opportunity. The foregoing sequence of first in increasing order of carrier index and then in increasing order of PDCCH monitoring occasion index may be understood as follows: In a case in which a same time domain resource (a subframe or a slot) in a plurality of carriers is scheduled for downlink transmission, when statistics on the C-DAI are collected, first statistics on PDCCH detection opportunities on carriers whose indexes are ranked in the front are collected, and then statistics on PDCCH detection opportunities on carriers whose indexes are ranked in the rear are collected. For example, both a slot n+1 of a carrier 1 and a slot n+1 of a carrier 2 are PDCCH detection opportunities (for example, scheduled PDSCH transmissions). In this case, a C-DAI in DCI corresponding to the slot n+1 of the carrier 1 is first counted, and then a C-DAI in DCI corresponding to the slot n+1 of the carrier 2 are counted. That is, a value of the C-DAI in the DCI corresponding to the slot n+1 of the carrier 2 is greater than a value of the C-DAI in the DCI corresponding to the slot n+1 of the carrier 1 by 1. For example, if the value of the C-DAI in the DCI corresponding to the slot n+1 of the carrier 1 is n, the value of the C-DAI in the DCI corresponding to the slot n+1 of the carrier 2 is n+1.

A value of a T-DAI may indicate a quantity of occasions for scheduled PDSCH transmission or a quantity of PDCCH detection opportunities until a current PDCCH detection opportunity. It should be noted that, statistics collection of the T-DAI does not need to follow the sequence of first in increasing order of carrier index and then in increasing order of PDCCH monitoring occasion index. T-DAI values of all serving cells on a same PDCCH detection occasion are the same, and are updated with the PDCCH detection occasion. For example, both a slot n+1 of a carrier 1 and a slot n+1 of a carrier 2 are PDCCH detection opportunities (for example, scheduled PDSCH transmissions). In this case, a value of a T-DAI in DCI corresponding to the slot n+1 of the carrier 1 is the same as a value of a T-DAI in DCI corresponding to the slot n+1 of the carrier 2.

In an embodiment, an indication field of the C-DAI has a maximum of two bits, an indication field of the T-DAI has a maximum of two bits, and a maximum quantity that is indicated is 4. For example, in DAI information of a DCI format 1_0, "00, 01, 10, 11" indicates that an accumulative quantity of scheduled PDSCHs is "1, 2, 3, 4". When the total quantity of scheduled PDSCH transmissions is greater than 4, the quantity is cyclically counted from 00. It can be learned that DAI information of the fifth PDSCH transmission is the same as that of the first PDSCH transmission.

The HARQ codebook includes feedback information of scheduled PDSCH transmissions. It may be understood that the size of the HARQ codebook may depend on the total quantity of scheduled PDSCH transmissions. For a semi-persistent codebook, the size of the codebook may be fixed, and is determined by the total quantity of scheduled PDSCH transmissions. For a dynamic codebook, the terminal device needs to determine a total quantity of PDSCH transmissions based on DAIs, and determine a size of the codebook based on the determined total quantity of PDSCH transmissions. In a dynamic codebook mechanism, missing detection of a last piece of DCI by the terminal device may be deduced by using a value of a T-DAI in another piece of DCI on a same PDCCH detection opportunity. However, when four consecutive pieces of DCI are not detected, the total quantity of PDSCH transmissions cannot be determined. The terminal device may generate a HARQ codebook whose quantity of bits is different from that expected by the network device. However, this probability is very low. If the network side determines that this case occurs, it can almost be considered that the terminal device is out of synchronization and needs to perform random access again.

4. HARQ Feedback Disabling Process

In some scenarios such as NTN, a HARQ feedback disabling mechanism is introduced. A HARQ feedback disabling process does not need to be fed back, and only a HARQ feedback enabling process needs to be fed back. In the HARQ feedback disabling mechanism, a size of a HARQ codebook may depend only on a quantity of HARQ feedback enabling processes. DAI fields in DCI corresponding to the HARQ feedback enabling processes may be counted according to a sequence of carriers and PDCCH detection opportunities, that is, the HARQ feedback disabling processes are not counted.

How to design a DAI field in DCI corresponding to a HARQ feedback disabling process and a meaning of the DAI field is a problem that needs to be considered. In an embodiment, a value of a DAI field in DCI corresponding to a HARQ feedback disabling process is the same as a value of a DAI field in DCI of a HARQ feedback enabling process adjacent to the HARQ feedback disabling process. If all HARQ feedback processes corresponding to an uplink feedback slot are HARQ feedback disabling processes, how the network device configures DCI corresponding to the HARQ feedback disabling processes and how the terminal device determines whether to perform HARQ feedback are problems that need to be resolved.

An embodiment of this application provides a communication method, to resolve, in a HARQ feedback disabling mechanism, a problem that a terminal device determines whether to perform HARQ feedback.

Figure 4:
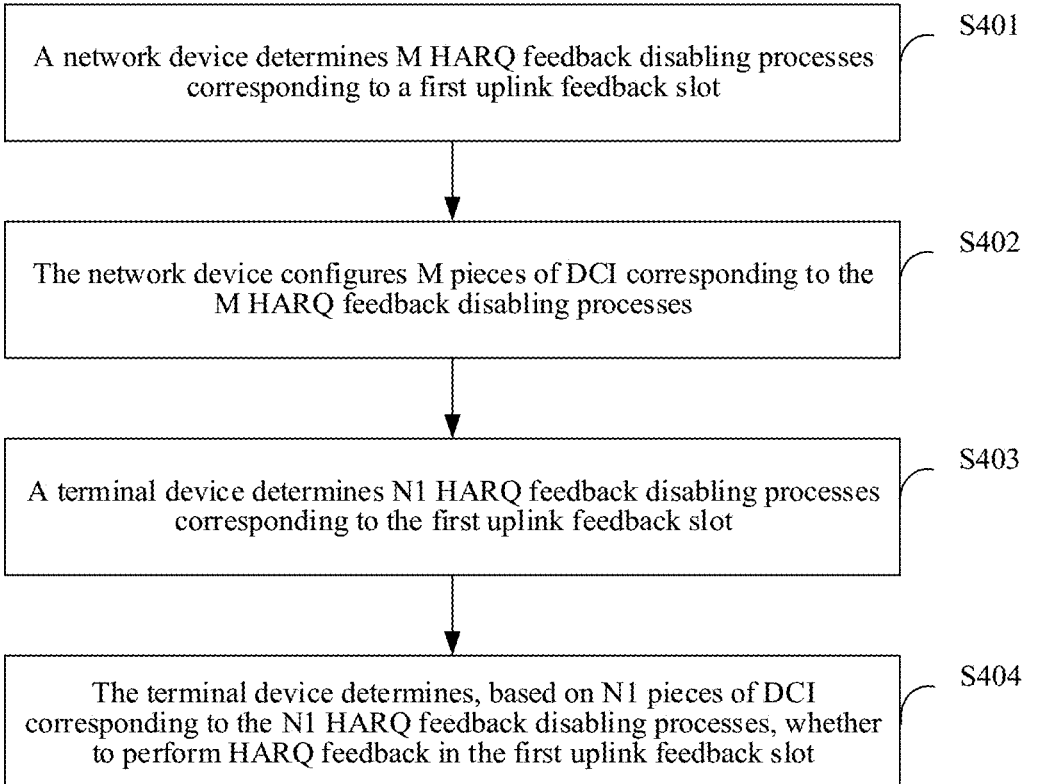
FIG. 4 is a schematic flowchart of a communication method according to an embodiment of this application.

As shown in FIG. 4, a specific procedure of the communication method provided in this embodiment of this application is as follows:

S401: A network device determines M HARQ feedback disabling processes corresponding to a first uplink feedback slot.

M is a positive integer, each of the M HARQ feedback disabling processes corresponds to one piece of DCI, and the M HARQ feedback disabling processes correspond to M pieces of DCI. DCI corresponding to a HARQ feedback disabling process may be used to schedule downlink data transmission of the HARQ feedback disabling process, for example, PDSCH transmission.

S402: The network device configures the M pieces of DCI corresponding to the M HARQ feedback disabling processes.

The M pieces of DCI indicate whether to perform HARQ feedback in the first uplink feedback slot.

S403: A terminal device determines N1 HARQ feedback disabling processes corresponding to the first uplink feedback slot.

N1 is less than or equal to M, and N1 is a positive integer. Each of the N1 HARQ feedback disabling processes corresponds to one piece of DCI, and the N1 HARQ feedback disabling processes correspond to N1 pieces of DCI.

S404: The terminal device determines, based on the N1 pieces of DCI corresponding to the N1 HARQ feedback disabling processes, whether to perform HARQ feedback in the first uplink feedback slot.

According to the embodiment in FIG. 4, the terminal device determines, based on the N1 pieces of DCI corresponding to the N1 HARQ feedback disabling processes, whether to perform HARQ feedback in the first uplink feedback slot. Therefore, the terminal device can determine, in the HARQ feedback disabling mechanism, whether to perform HARQ feedback.

The following provides some optional implementations with reference to the embodiment in FIG. 4.

The terminal device may determine an occasion for candidate PDSCH reception based on a value of K1 in a set of feedback timing parameters K1. For example, the terminal device may obtain a slot number by using the first uplink feedback slot as a basis and performing backward deduction on a value of each K1. According to slot configuration, it is determined whether the obtained slot number conflicts with a slot that is configured as an uplink slot. If a conflict exists, it indicates that there is no PDSCH transmission in a position of the slot number, and the slot number is not marked as an occasion for candidate PDSCH reception. If there is no conflict, the slot number is marked as an occasion for candidate PDSCH reception. When the terminal device supports a capability of transmitting a plurality of PDSCHs in one slot, a row that does not overlap in time resources needs to be selected from a time domain allocation parameter table, and finally a remaining downlink slot number is an occasion for candidate PDSCH reception.

When there are a plurality of serving cells for the terminal device or a plurality of carriers are configured for the terminal device, a plurality of carriers may be used to transmit a PDSCH in one slot. Each carrier in each slot may correspond to one HARQ process. The terminal device may determine an occasion for candidate PDSCH reception corresponding to the first uplink feedback slot. One occasion for candidate PDSCH reception is one time unit. In this application, for example, a time unit is a slot, or may be another unit such as a subframe. Then, the terminal device determines, based on the plurality of configured carriers, HARQ processes corresponding to the first uplink feedback slot. For example, if three carriers are configured for the terminal device, and determined occasions for candidate PDSCH reception corresponding to the first uplink feedback slot are three slots, a maximum of 3*3=9 HARQ processes correspond to the first uplink feedback slot.

The terminal device detects DCI on a HARQ process, and if DCI is detected, the terminal device receives a PDSCH based on the DCI. If the terminal device does not detect DCI on a HARQ process, one case is that the network device does not schedule data on the HARQ process, and the other case is that the terminal device misses detection of DCI.

The network device may indicate, to the terminal device by using RRC signaling, an identifier set of HARQ feedback disabling processes, or may indicate an identifier set of HARQ feedback enabling processes. The network device further indicates, by using DCI, a type of a HARQ process corresponding to the DCI. For example, the type is a HARQ feedback enabling process or a HARQ feedback disabling process. The terminal device receives downlink data on an occasion for candidate PDSCH reception corresponding to the first uplink feedback slot. If all HARQ processes on which the terminal device receives downlink data are HARQ feedback disabling processes, and the terminal device misses detection of DCI of a HARQ feedback enabling process, the terminal device generally does not need to perform HARQ feedback in the first uplink feedback slot. However, when a HARQ feedback enabling process exists, the terminal device needs to perform HARQ feedback in the first uplink feedback slot. If the terminal device does not perform HARQ feedback, understanding of the terminal device is inconsistent with that of the network device. In the embodiment in FIG. 4, the HARQ processes on which the terminal device receives downlink data are the N1 HARQ feedback disabling processes. The terminal device may determine, by using the N1 pieces of DCI corresponding to the N1 HARQ feedback disabling processes corresponding to the first uplink feedback slot, whether missed DCI detection occurs on a HARQ feedback enabling process, and whether to perform HARQ feedback in the first uplink feedback slot.

The following provides some optional implementations of determining, based on the N1 pieces of DCI corresponding to the N1 HARQ feedback disabling processes, whether to perform HARQ feedback in the first uplink feedback slot. Correspondingly, an optional manner of configuring signaling used by the network device to configure the N1 pieces of DCI corresponding to the N1 HARQ feedback disabling processes is provided.

A case in which it is determined that HARQ feedback needs to be performed in the first uplink feedback slot is first described.

If a quantity of HARQ feedback enabling processes corresponding to the first uplink feedback slot is 0, that is, all HARQ processes corresponding to data configured on the occasion for PDSCH transmission corresponding to the first uplink feedback slot are HARQ feedback disabling processes, the network device configures, in the following manner, DCI corresponding to all the HARQ feedback disabling processes corresponding to the first uplink feedback slot: The first uplink feedback slot corresponds to the M HARQ feedback disabling processes, and a first field in each of the M pieces of DCI corresponding to the M HARQ feedback disabling processes is set to a first value. The first field in each of the M pieces of DCI corresponding to the M HARQ feedback disabling processes is set to the first value, to indicate the terminal device not to perform HARQ feedback in the first uplink feedback slot. Optionally, first fields in some of the M pieces of DCI are set to reserved fields (reserved), and first fields in other of the M pieces of DCI are all set to the first value.

When a first field in each of the N1 pieces of DCI corresponding to the N1 HARQ feedback disabling processes is the first value, the terminal device determines not to perform HARQ feedback in the first uplink feedback slot.

If the first field in each of the N1 pieces of DCI is the first value, it indicates that a quantity N2 of the HARQ feedback enabling processes corresponding to the first uplink feedback slot is 0. Since there is no HARQ feedback enabling process in the HARQ processes corresponding to the first uplink feedback slot, no missed DCI detection occurs on a HARQ feedback enabling process. Therefore, the terminal device may determine not to perform HARQ feedback in the first uplink feedback slot. In this way, it can be ensured that no missed DCI detection occurs on a HARQ feedback enabling process, thereby improving correctness of HARQ feedback.

In an aspect, the N1 pieces of DCI corresponding to the N1 HARQ feedback disabling processes may be further used to indicate the quantity N2 of the HARQ feedback enabling processes corresponding to the first uplink feedback slot.

When the first field in each of the N1 pieces of DCI is the first value, it indicates that N2 is 0.

The first field in the DCI may be one or more of the following fields in the DCI:

NDI, RV, TPC command for scheduled PUCCH, PUCCH resource indicator, PDSCH-to-HARQ feedback timing indicator, or DAI.

Table 1 shows quantities of bits occupied by fields in DCI in different formats.

TABLE 1

| DCI field | Format1_0 (bit) | Format1_1(bit) |
|---|---|---|
| New data indicator (NDI) | 1 | 1 |
| Redundancy version (RV) | 2 | 2 |
| TPC command for scheduled PUCCH | 2 | 2 |
| PUCCH resource indicator | 3 | 3 |
| PDSCH-to-HARQ feedback timing indicator | 3 | 0, 1, 2, 3 |
| Downlink assignment index (DAI) | 2 | 0, 2, 4 |

When all the HARQ processes corresponding to the data configured on the occasion for PDSCH transmission corresponding to the first uplink feedback slot are HARQ feedback disabling processes, and the foregoing fields in the DCI corresponding to the HARQ feedback disabling processes no longer have an original indication meaning, in this embodiment of this application, the network device may set a first field in the DCI corresponding to the HARQ feedback disabling processes to the first value when all the HARQ processes corresponding to the data configured on the occasion for PDSCH transmission corresponding to the first uplink feedback slot are HARQ feedback disabling processes. The first field may be any one or more of the foregoing fields. When the first field is any more than one of the foregoing fields, all values of the plurality of fields may be the first value, or specified values of the plurality of fields may be different. For example, one field in the plurality of fields is a specified value, and another field is another specified value. However, specified values of same fields in a plurality of fields in the DCI corresponding to all the HARQ feedback disabling processes corresponding to the first uplink feedback slot are the same. For example, all fields 1 in the DCI corresponding to all the HARQ feedback disabling processes corresponding to the first uplink feedback slot are an agreed value xx, and all fields 2 in the DCI corresponding to all the HARQ feedback disabling processes corresponding to the first uplink feedback slot are an agreed value yy. xx and yy can be any value from 00 to 11 (including 00 and 11).

The following uses an example in which the first field is a DAI for descriptions.

If the quantity of the HARQ feedback enabling processes corresponding to the first uplink feedback slot is 0, that is, all the HARQ processes corresponding to the data configured on the occasion for PDSCH transmission corresponding to the first uplink feedback slot are HARQ feedback disabling processes, the network device configures, in the following manner, the DCI corresponding to all the HARQ feedback disabling processes corresponding to the first uplink feedback slot: The first uplink feedback slot corresponds to the M HARQ feedback disabling processes, and a DAI in each of the M pieces of DCI corresponding to the M HARQ feedback disabling processes is set to the first value.

When a DAI field in each of the N1 pieces of DCI corresponding to the N1 HARQ feedback disabling processes is the first value, the terminal device determines not to perform HARQ feedback in the first uplink feedback slot.

The N1 pieces of DCI corresponding to the N1 HARQ feedback disabling processes may be further used to indicate the quantity N2 of the HARQ feedback enabling processes corresponding to the first uplink feedback slot. When the DAI field in each of the N1 pieces of DCI is the first value, it indicates that N2 is 0.

In an embodiment, all bits of the first value may be 0. For example, if a DCI format is 1_0, the DAI field is 00. If the DCI format is 1_1, the DAI field is 0000, where the first two bits are a C-DAI, and the last two bits are a T-DAI. FIG. 5a shows DCI configuration of a PDCCH detection opportunity or an occasion for PDSCH transmission. Four carriers are configured for a terminal device, or four serving cells are configured for the terminal device and are denoted as serving cells 1 to 4. Each serving cell corresponds to one HARQ process. HARQ processes corresponding to the serving cell 1, the serving cell 3, and the serving cell 4 are HARQ feedback disabling processes, and a HARQ process corresponding to the serving cell 2 is a HARQ feedback enabling process. A network device schedules downlink data in the serving cell 1, the serving cell 3, and the serving cell 4, and does not schedule downlink data in the serving cell 2. That is, all HARQ processes corresponding to the data scheduled on an occasion for PDSCH transmission are HARQ feedback disabling processes. If a DCI format is 1_1, the network device sets a DAI in each piece of DCI corresponding to the three HARQ processes of the serving cell 1, the serving cell 3, and the serving cell 4 to 0000. It may be understood that, if the DCI format is 1_0, the DAI in each piece of the DCI corresponding to the three HARQ processes is set to 00.

FIG. 5b shows DCI configuration of three occasions for PDSCH transmission. Four carriers are configured for a terminal device, or four serving cells are configured for the terminal device and are denoted as serving cells 1 to 4. Each serving cell corresponds to one HARQ process. Three occasions for PDSCH transmission and the four serving cells may be configured as 12 HARQ processes. A HARQ process corresponding to the serving cell 1 on the first occasion for PDSCH transmission is a HARQ feedback disabling process, a HARQ process corresponding to the serving cell 2 on the third occasion for PDSCH transmission is a HARQ feedback disabling process, and the remaining HARQ processes are HARQ feedback enabling processes. A network device schedules downlink data PDSCH1 in the serving cell 1 on the first occasion for PDSCH transmission, schedules downlink data PDSCH2 in the serving cell 2 on the third occasion for PDSCH transmission, and schedules no downlink data on all the HARQ feedback enabling processes. That is, all the HARQ processes corresponding to the data scheduled on the occasions for PDSCH transmission are HARQ feedback disabling processes. If a DCI format is 1_1, the network device sets a DAI in each piece of DCI corresponding to the two HARQ feedback disabling processes to 0000. If the DCI format is 1_0, the network device sets the DAI in each piece of the DCI corresponding to the two HARQ feedback disabling processes to 00.

Based on the schematic diagram of DCI configuration shown in FIG. 5a, as shown in FIG. 6a, if the network device also schedules downlink data in the serving cell 2, a value of a DAI in DCI corresponding to the HARQ feedback enabling process of the serving cell 2 should be set to a total quantity of HARQ feedback enabling processes in a current occasion for PDSCH transmission, that is, 00 or 0000. The DCI format 1_1 is used as an example for descriptions, that is, 0000. In a case in which a HARQ feedback enabling process exists, the network device configures a value of a DAI field in DCI corresponding to another HARQ feedback disabling process to be the same as a value of a DAI field in DCI of a HARQ feedback enabling process adjacent to the HARQ feedback disabling process. Therefore, DAI values of the remaining three HARQ feedback disabling processes are also 0000. In this way, although the serving cell 2 corresponds to a HARQ feedback enabling process, a value of a DAI in DCI is the same as DAI values of the other three HARQ feedback disabling processes. If the terminal device misses, in the serving cell 2, detection of the DCI corresponding to the HARQ feedback enabling process in the serving cell 2, but receives that all the values of the DAIs in the DCI corresponding to the HARQ feedback disabling processes are 0000, the terminal device mistakenly considers that HARQ feedback does not need to be performed. However, the network device schedules downlink data on the HARQ feedback enabling process, which requires that the terminal device perform HARQ feedback. Consequently, the terminal device and the network device have inconsistent understanding, resulting in a decoding failure on a network side.

Similarly, based on the schematic diagram of DCI configuration shown in FIG. 5b, as shown in FIG. 6b, if the network device schedules PDSCH1 to PDSCH7, HARQ processes corresponding to DCI used for scheduling PDSCH1 and PDSCH7 are HARQ feedback disabling processes, and other HARQ processes are HARQ feedback enabling processes. The network device configures a value of a DAI field in DCI corresponding to another HARQ feedback disabling process to be the same as a value of a DAI field in DCI of a HARQ feedback enabling process adjacent to the HARQ feedback disabling process. That is, DAIs in DCI corresponding to PDSCH1 to PDSCH7 are respectively set to 0000, 0000, 0100, 1000, 1100, 0000, and 0000. If the terminal device misses detection of DCI corresponding to the five HARQ feedback enabling processes, and receives DCI corresponding to one or two HARQ feedback disabling processes, the terminal device determines that all values of DAIs in the received DCI corresponding to the HARQ feedback disabling processes are 0000. In this case, the terminal device mistakenly considers that HARQ feedback does not need to be performed. However, the network device schedules downlink data on the HARQ feedback enabling processes, which requires that the terminal device perform HARQ feedback. Consequently, the terminal device and the network device have inconsistent understanding, resulting in a decoding failure on a network side. Although a probability of missing detection of five pieces of DCI is very low, for all possible PDCCH detection opportunities of an uplink feedback slot in a HARQ feedback disabling mechanism, a quantity of scenarios in which only one or two HARQ feedback enabling processes are configured and a quantity of scenarios in which only HARQ feedback disabling processes are configured increase. If missed detection occurs on the only one or two HARQ feedback enabling processes, a probability that this scenario is confused with a scenario in which only HARQ feedback disabling processes are configured increases.

Based on this, in another embodiment, all bits of the first value may be 1. For example, if a DCI format is 1_0, a DAI field is 11. If the DCI format is 1_1, the DAI field is 1111, where the first two bits are a C-DAI, and the last two bits are a T-DAI. The following uses an example in which the DCI format is 1_1 and the DAI field is 1111 for descriptions. For the network side, if the quantity of the HARQ feedback enabling processes corresponding to the first uplink feedback slot is 0, that is, all the HARQ processes corresponding to the data configured on the occasion for PDSCH transmission corresponding to the first uplink feedback slot are HARQ feedback disabling processes, the network device configures, in the following manner, the DCI corresponding to all the HARQ feedback disabling processes corresponding to the first uplink feedback slot: The first uplink feedback slot corresponds to the M HARQ feedback disabling processes, and the DAI in each of the M pieces of DCI corresponding to the M HARQ feedback disabling processes is set to 1111. For the terminal device, when the DAI field in each of the N1 pieces of DCI corresponding to the N1 HARQ feedback disabling processes is 1111, the terminal device determines not to perform HARQ feedback in the first uplink feedback slot. With reference to the examples in FIG. 6*a* and FIG. 6*b*, when the terminal device detects that all the DAIs in the DCI corresponding to the HARQ feedback disabling processes are set to 0000 instead of 1111, the terminal device determines to perform HARQ feedback. This can help the terminal device determine whether missed DCI detection occurs on a HARQ feedback enabling process.

The first field may be another field other than the DAI field. When the first field is another field other than the DAI field, the field may have the following indication meaning: The field indicates that the terminal device does not need to perform HARQ feedback in the first uplink feedback slot, or the field indicates that all the HARQ processes corresponding to the data configured on the occasion for PDSCH transmission corresponding to the first uplink feedback slot are HARQ feedback disabling processes, or the field indicates that a quantity of HARQ feedback enabling processes corresponding to the data configured on the occasion for PDSCH transmission corresponding to the first uplink feedback slot is 0. Alternatively, the field may be terminal device-level signaling, and may be transmitted in RRC. The field may be sent when all processes of configured downlink data are HARQ feedback disabling processes, and the field is not sent when there is a HARQ feedback enabling process of the configured downlink data. For example, the field may be an NDI. Because all HARQ processes of the configured data are HARQ feedback disabling processes, an NDI field in DCI is no longer necessary to indicate whether the data is newly transmitted or retransmitted. One bit of the field may be used, and the NDI field may be additionally configured as a flag, for example, the NDI field is set to 0. Alternatively, the field may be always sent. For example, if the NDI field is set to 1, it indicates that the quantity of the HARQ feedback enabling processes corresponding to the data configured on the occasion for PDSCH transmission corresponding to the first uplink feedback slot is not 0. If the DCI field is set to 0, it indicates that the quantity of the HARQ feedback enabling processes corresponding to the data configured on the occasion for PDSCH transmission corresponding to the first uplink feedback slot is 0.

When the network device sends the field, all DAIs in DCI corresponding to the HARQ feedback disabling processes may be set to an agreed value. The agreed value may be any value from 00 to 11 (including 00 and 11), or any value from 0000 to 1111 (including 0000 and 1111). If the terminal device receives the field, the terminal device may determine, based on the field, not to perform HARQ feedback. Alternatively, when the terminal device receives the field and determines that all the values of the DAIs in the DCI corresponding to the HARQ feedback disabling processes are the agreed value, the terminal device determines not to perform HARQ feedback.

The following describes a case in which it is determined that HARQ feedback does not need to be performed in the first uplink feedback slot.

If the quantity of the HARQ feedback enabling processes corresponding to the first uplink feedback slot is not 0, not all first fields in the M pieces of DCI corresponding to the M HARQ feedback disabling processes corresponding to the first uplink feedback slot are set to the first value. Some first fields are the first value and some first fields are not the first value, or none of the first fields is the first value. First fields in DCI corresponding to the HARQ feedback enabling processes corresponding to the first uplink feedback slot are set according to an original indication meaning of the first fields. In the M pieces of DCI corresponding to the M HARQ feedback disabling processes, a first field in one or more pieces of DCI is not the first value, and is used to indicate the terminal device to perform HARQ feedback in the first uplink feedback slot.

In this case, not all first fields in the N1 pieces of DCI corresponding to the N1 HARQ feedback disabling processes corresponding to the first uplink feedback slot are the first value.

When a first field in one or more of the N1 pieces of DCI corresponding to the N1 HARQ feedback disabling processes is not the first value, the terminal device determines to perform HARQ feedback in the first uplink feedback slot. First fields in some of the N1 pieces of DCI are the first value and first fields in some of the N1 pieces of DCI are not the first value, or none of the first fields in all the N1 pieces of DCI is the first value.

In an aspect, the N1 pieces of DCI corresponding to the N1 HARQ feedback disabling processes may be further used to indicate the quantity N2 of the HARQ feedback enabling processes corresponding to the first uplink feedback slot. When the first field in the one or more of the N1 pieces of DCI is not the first value, it indicates that N2 is not 0.

For descriptions of the first field and the first value, refer to the foregoing descriptions in "the case in which it is determined that HARQ feedback needs to be performed in the first uplink feedback slot".

For example, the first field is a DAI. If the quantity of the HARQ feedback enabling processes corresponding to the first uplink feedback slot is not 0, DAI fields in the DCI corresponding to the HARQ feedback enabling processes may be counted according to a sequence of carriers and PDCCH detection opportunities. A value of a DAI field in DCI corresponding to a HARQ feedback disabling process is the same as a value of a DAI field in DCI of a HARQ feedback enabling process adjacent to the HARQ feedback disabling process.

If the network device determines that the quantity of the HARQ feedback enabling processes is not 0, the network device sequentially counts the HARQ feedback enabling processes, and configures the DAI fields in the DCI corresponding to the HARQ feedback enabling processes. In addition, the network device configures a value of a DAI field in DCI corresponding to a HARQ feedback disabling process to be the same as a value of a DAI field in DCI of a HARQ feedback enabling process adjacent to the HARQ feedback disabling process. In this application, a HARQ feedback disabling process may be denoted as HARQd, and a HARQ feedback enabling process may be denoted as HARQe. In a possible design, a value of a DAI field corresponding to a HARQd is equal to a value of a DAI field of a previous HARQe. If a HARQd is configured on the first carrier of the first PDCCH detection opportunity, a value of a DAI field in DCI of the process is equal to a value of a DAI field corresponding to a next HARQe of the process. If only a HARQd is configured on the first PDCCH detection opportunity, and no HARQe is configured on the first PDCCH detection opportunity, DAI fields in DCI corresponding to all HARQds on the first PDCCH detection opportunity may be set to 11 or 1111, to indicate to the terminal device that no HARQe exists until a current PDCCH detection opportunity. In this way, the terminal device may consider that four HARQes are configured on the first PDCCH detection opportunity, but does not receive corresponding DCI. Therefore, the terminal device mistakenly considers that missed detection occurs on the four HARQes on the first PDCCH detection opportunity. However, the terminal device may determine a final size of a codebook based on a DAI corresponding to a subsequent HARQe. Generally, understanding inconsistency between the terminal device and the network device does not occur.

The network device may indicate, to the terminal device by using RRC signaling, an identifier set of HARQ feedback disabling processes, or may indicate an identifier set of HARQ feedback enabling processes. The network device further indicates, by using DCI, a type of a HARQ process corresponding to the DCI. For example, the type is a HARQ feedback enabling process or a HARQ feedback disabling process. The terminal device detects DCI on the occasion for candidate PDSCH reception corresponding to the first uplink feedback slot. If a quantity of HARQes corresponding to DCI received by the terminal device is 0, that is, the terminal device does not detect DCI of a HARQe, and all first fields in DCI of HARQds received by the terminal device are the first value. In this case, the terminal device does not perform HARQ feedback in the first uplink feedback slot. If the quantity of the HARQes corresponding to the DCI received by the terminal device is not 0, that is, the terminal device detects DCI of a HARQe, and determines, based on a process number of the HARQe, that the process is a HARQ feedback enabling process, the terminal device needs to perform HARQ feedback in the first uplink feedback slot. If the quantity of the HARQes corresponding to the DCI received by the terminal device is 0, and not all the first fields in the DCI of the HARQds received by the terminal device are the first value, the terminal device performs HARQ feedback in the first uplink feedback slot.

When the terminal device needs to perform HARQ feedback, the terminal device needs to determine a size of a HARQ codebook used for performing HARQ feedback in the first uplink feedback slot.

The terminal device configures a codebook type based on HARQ of higher layer signaling. If the codebook type is a semi-persistent codebook Type-1, the terminal device determines a size of a semi-persistent codebook based on the occasion for candidate PDSCH reception corresponding to the first uplink feedback slot. If the codebook type is a dynamic codebook Type-2, the terminal device may determine a size of a dynamic codebook in the following manners:

Manner 1: If all received data is on HARQ feedback disabling processes, or if the quantity of the HARQes corresponding to the received DCI is 0, the terminal device determines the size of the HARQ codebook based on a sum of change amplitudes of DAI fields in the N1 pieces of DCI.

A DAI field in the DCI format 1_o is used as an example, and the DAI field changes from 00 to 11 (including 00 and 11). For example, a change amplitude of the DAI field refers to that a change amplitude is 1 when 00 appears for the first time, a change amplitude from 00 to 01 is 1, and both a change amplitude from 01 to 10 and a change amplitude from 10 to 11 are 1. A change amplitude from 00 to 10 is 2, and a change amplitude from 00 to 11 is 3. For example, DAI fields received by the terminal device on the HARQ feedback disabling processes are respectively 00, 01, 10, 00, 01, and 10. A change amplitude is 1 when 00 appears for the first time, a change amplitude from the first 00 to a next 00 is 4, and a corresponding count is 5. A change amplitude from the second 00 to the second 10 is 3, and a corresponding count is 7. It may be considered that a DAI field indicates that a quantity of PDSCHs scheduled by a current serving cell until a current occasion for PDSCH reception is 7. In addition, the size of the codebook is determined based on the quantity 7.

A DAI field in the DCI format 1_1 has four bits in total, and therefore, a sum of change amplitudes may be calculated according to the first two bits. For a specific method, refer to the DCI format 1_0.

Manner 2: If data is received on a HARQ feedback enabling process, or if DCI is detected on a HARQ feedback enabling process, or if the quantity of the HARQes corresponding to the received DCI is not 0, and data is received only on a first HARQ feedback disabling process on a last occasion for candidate PDSCH reception corresponding to the first uplink feedback slot, the terminal device compares whether a value of a DAI received on the first HARQ feedback disabling process is the same as a value of a DAI received on a first HARQ feedback enabling process. If the values are different, the terminal device determines a size of a HARQ codebook used for performing HARQ feedback in the first uplink feedback slot based on the value of the DAI received on the first HARQ feedback disabling process, where the first HARQ feedback enabling process is a last HARQ feedback enabling process on which data is received.

Based on Manner 2, as shown in FIG. 7, if the quantity of the HARQes received by the terminal device is not 0, and the terminal receives only a HARQd on the last occasion for candidate PDSCH reception, or a last piece of data received by the terminal device is data on a HARQd, a value of a DAI in DCI corresponding to the HARQd is compared with a value of a DAI in DCI corresponding to a last HARQe. If the values are not equal, the terminal device determines a size of a dynamic codebook based on a DAI in the HARQd received on the last occasion for candidate PDSCH reception. When the terminal device compares the value of the DAI in the DCI corresponding to the HARQd with the value of the DAI in the DCI corresponding to the last HARQe, if T-DAI fields exist, the terminal device first determines values represented by bits in the T-DAI fields. If the values represented by the bits in the T-DAI fields are the same, the terminal device needs to determine values of bits in T-DAI fields with reference to the C-DAI fields. In FIG. 7, the terminal device sends PDSCH1 to PDSCH8 on two occasions for PDSCH transmission and in four serving cells. The terminal device receives no data on HARQ processes corresponding to PDSCH4, PDSCH5, PDSCH7, and PDSCH8. A HARQ process corresponding to PDSCH6 is a HARQd, and other processes are HARQes. DAI fields in DCI received by the terminal device are respectively 0010, 0110, 1010, and 0010. The terminal device receives only a HARQd on a last occasion for candidate PDSCH reception, and a value of a corresponding DAI field is 0010. The terminal device compares the value of the DAI in DCI corresponding to the HARQd with a value of a DAI in DCI corresponding to a last HARQe, that is, the terminal device compares 0010 with 1010. All T-DAI fields are 10, where 10 may represent that a total quantity is 3, or may represent that the total quantity is 7 or another value. The terminal device continues to compare C-DAI fields in 0010 and 1010, that is, 00 and 10, and finds that 10 has been counted to 3 on the HARQe. In this case, a quantity of HARQds received on the last occasion for candidate PDSCH reception is definitely greater than 3. Therefore, it can be determined that 10 in the T-DAI fields represents that the total quantity is 7. The terminal device determines a size of a codebook based on the total quantity 7.

In conclusion, in Manner 2, the following is described: If the terminal device receives only the HARQd on the last occasion for PDSCH reception, the terminal device needs to determine the size of the codebook based on the DAI value of the HARQd and the DAI value of the last HARQe. If a last piece of data on all occasions for PDSCH reception is data on a HARQe, the terminal device may determine the size of the codebook based on a DAI value of the HARQe.

In this application, after determining the size of the HARQ codebook, the terminal device fills bits in the codebook based on an actual decoding status, and may perform HARQ feedback in the first uplink feedback slot based on the size of the HARQ codebook.

As described above, the first field may be another field other than the DAI field. When the first field is another field other than the DAI field, if the terminal device does not receive the field, or the terminal device receives the field indicating that the quantity of the HARQ feedback enabling processes corresponding to the data configured on the occasion for PDSCH transmission corresponding to the first uplink feedback slot is not 0, the terminal device determines that scheduled data is transmitted on the HARQ feedback enabling processes. In this case, if the terminal does not receive data on the HARQ feedback enabling processes, and not all first fields in the HARQ feedback disabling processes received by the terminal device are an agreed value, the terminal device determines a size of a dynamic codebook based on a value of a DAI in DCI corresponding to a last received HARQ feedback disabling process.

The foregoing embodiments describe a HARQ feedback method for dynamically scheduled data. For semi-persistent scheduling (SPS) data, an embodiment of this application further provides a HARQ feedback method. A semi-persistent scheduling process mainly includes: configuring, by a network device, SPS for a terminal device by using higher layer signaling, and sending, by the network device, activation DCI, where the activation DCI is used to activate SPS. The terminal device receives the activation DCI, and determines that periodic data needs to be received. For SPS, performing HARQ feedback or not performing HARQ feedback may be set for an entire SPS configuration cycle. If performing HARQ feedback is set in the SPS configuration cycle, the terminal device performs HARQ feedback on data in the SPS cycle, and the network device may determine, based on HARQ feedback information of a first piece of data in the SPS cycle, whether the activation DCI is received. For example, an ACK indicates that the activation DCI is received, and a NACK indicates that the activation DCI is not received. If not performing HARQ feedback is set for the SPS configuration cycle, the terminal device does not need to perform HARQ feedback on the first piece of data, and the network device does not know whether the activation DCI is received. In this embodiment of this application, in a scenario in which not performing HARQ feedback is set for the SPS configuration cycle, the terminal device also needs to perform HARQ feedback on the first piece of data. In this way, the network device may determine, based on HARQ feedback information of the first piece of data, whether the activation DCI is received. For example, if the terminal device receives the activation DCI, the terminal device performs HARQ feedback in an uplink feedback slot corresponding to the first piece of data.

For example, a HARQ feedback method for SPS data is described as follows: A network side separately configures, by using higher layer signaling, whether to configure feedback for each SPS configuration, and a terminal device sequentially determines, in ascending order of indexes of serving cells, whether SPS in each serving cell is in an activated state. If the SPS is in the activated state, and higher layer signaling indicates that the SPS requires feedback, the terminal device performs feedback in a feedback slot corresponding to data transmitted by the SPS. If the SPS is in the activated state, and the higher layer signaling indicates that the SPS does not require feedback, the terminal device performs feedback on a first piece of data transmitted by the SPS in a feedback slot corresponding to the first piece of data.

It should be noted that, examples in application scenarios in this application merely show some possible implementations, and are intended to better understand and describe the methods in this application. Persons skilled in the art may obtain examples of some evolved forms according to the reference signal indication method provided in this application.

To implement the functions in the methods provided in embodiments of this application, the terminal device may include a hardware structure and/or a software module, and implement the foregoing functions in a form of a hardware structure, a software module, or a hardware structure plus a software module. Whether a function in the foregoing functions is performed by using the hardware structure, the software module, or the combination of the hardware structure and the software module depends on particular applications and design constraints of the technical solutions.

As shown in FIG. 8, based on a same technical concept, an embodiment of this application further provides a communication apparatus 800. The communication apparatus 800 may be a terminal device, or may be a functional component, a module, or the like in the terminal device, or may be another apparatus that can be used with the terminal device. In a design, the communication apparatus 800 may include modules that one-to-one correspond to the methods/operations/steps/actions performed by the terminal device in the foregoing method embodiments. The module may be implemented by a hardware circuit, software, or a combination of the hardware circuit and the software. In a design, the communication apparatus 800 may include a determining unit 801 and a feedback unit 802.

The determining unit 801 is configured to determine N1 hybrid automatic repeat request HARQ feedback disabling processes corresponding to a first uplink feedback slot, where N1 is a positive integer.

The feedback unit 802 is configured to determine, based on N1 pieces of downlink control information DCI corresponding to the N1 HARQ feedback disabling processes, whether to perform HARQ feedback in the first uplink feedback slot, where the N1 HARQ feedback disabling processes one-to-one correspond to the N1 pieces of DCI.

Optionally, when determining, based on the N1 pieces of downlink control information DCI corresponding to the N1 HARQ feedback disabling processes, whether to perform HARQ feedback in the first uplink feedback slot, the feedback unit 802 is configured to: when a first field in each of the N1 pieces of DCI is a first value, determine not to perform HARQ feedback in the first uplink feedback slot.

Optionally, when determining, based on the N1 pieces of downlink control information DCI corresponding to the N1 HARQ feedback disabling processes, whether to perform HARQ feedback in the first uplink feedback slot, the feedback unit 802 is configured to:

when a first field in one or more of the N1 pieces of DCI is not a first value, determine to perform HARQ feedback in the first uplink feedback slot.

Optionally, the determining unit 801 is further configured to:

if all received data is on HARQ feedback disabling processes, determine a size of a HARQ codebook according to a sum of change amplitudes of DAI fields in the N1 pieces of DCI.

The feedback unit 802 is further configured to perform HARQ feedback in the first uplink feedback slot based on the size of the HARQ codebook.

Optionally, the N1 pieces of DCI indicate a quantity N2 of HARQ feedback enabling processes corresponding to the first uplink feedback slot, where N2 is a non-negative integer.

When a first field in each of the N1 pieces of DCI is a first value, it indicates that N2 is 0.

When a first field in one or more of the N1 pieces of DCI is not the first value, it indicates that N2 is greater than 0.

Optionally, the first field is a downlink assignment index DAI field, and the first value is 1 for all bits.

Optionally, the first field includes one or more of the following fields: new data indicator NDI, redundancy version RV, transmit power control command for scheduled physical uplink control channel PUCCH, PUCCH resource indicator, physical downlink shared channel PDSCH to HARQ feedback timing indicator, or DAI.

The determining unit 801 and the feedback unit 802 may be further configured to perform other corresponding operations performed by the terminal device in the foregoing method embodiments. Details are not described herein again.

As shown in FIG. 9, based on a same technical concept, an embodiment of this application further provides a communication apparatus 900. The communication apparatus 900 may be a network device, or may be a functional component, a module, or the like in the network device, or may be another apparatus that can be used with the terminal device. In a design, the communication apparatus 900 may include modules that one-to-one correspond to the methods/operations/steps/actions performed by the terminal device in the foregoing method embodiments. The module may be implemented by a hardware circuit, software, or a combination of the hardware circuit and the software. In a design, the communication apparatus 900 may include a determining unit 901 and a configuration unit 902. The determining unit 901 is configured to determine M hybrid automatic repeat request HARQ feedback disabling processes corresponding to a first uplink feedback slot, where M is a positive integer.

The configuration unit 902 is configured to configure M pieces of downlink control information DCI corresponding to the M HARQ feedback disabling processes, where the M pieces of DCI indicate whether to perform HARQ feedback in the first uplink feedback slot, and the M HARQ feedback disabling processes one-to-one correspond to the M pieces of DCI.

Optionally, when configuring the M pieces of DCI corresponding to the M HARQ feedback disabling processes, the configuration unit 902 is configured to:

if a quantity N2 of HARQ feedback enabling processes corresponding to the first uplink feedback slot is 0, a first field in each of the M pieces of DCI is set to a first value; or if a quantity N2 of HARQ feedback enabling processes corresponding to the first uplink feedback slot is 0, a first field in one or more of the M pieces of DCI is set to be not a first value.

Optionally, the first field in each of the M pieces of DCI is the first value, and is used to indicate the terminal device not to perform HARQ feedback in the first uplink feedback slot; the first field in the one or more of the M pieces of DCI is not the first value, and indicates the terminal device to perform HARQ feedback in the first uplink feedback slot.

Optionally, the first field is a downlink assignment index DAI field, and the first value is 1 for all bits.

Optionally, the first field includes one or more of the following fields: new data indicator NDI, redundancy version RV, transmit power control command for scheduled physical uplink control channel PUCCH, PUCCH resource indicator, physical downlink shared channel PDSCH to HARQ feedback timing indicator, or DAI.

The determining unit 901 and the configuration unit 902 may be further configured to perform other corresponding operations performed by the terminal device in the foregoing method embodiments. Details are not described herein again.

Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

FIG. 10 shows a communication apparatus 1000 according to an embodiment of this application. The communication apparatus 1000 is configured to implement a function of the terminal device or the network device in the foregoing methods. When implementing a function of the terminal device, the communication apparatus 1000 may be the terminal device, an apparatus in the terminal device, or an apparatus that can be used with the terminal device. When implementing a function of the network device, the communication apparatus 1000 may be the network device, an apparatus in the network device, or an apparatus that can be used with the network device. The communication apparatus may be a chip system. In this embodiment of this application, the chip system may include a chip, or may include a chip and another discrete component. The communication apparatus 1000 includes at least one processor 1010, configured to implement a function of the terminal device or the network device in the methods provided in embodiments of this application. The communication apparatus 1000 may further include an interface circuit 1020. The interface circuit 1020 may be a transceiver, a circuit, a bus, a module, or another type of communication interface, and is configured to communicate with another device by using a transmission medium. For example, the interface circuit 1020 is used by the communication apparatus 1000 to communicate with another device.

The communication apparatus 1000 may further include at least one memory 1030. The memory 1030 is configured to store a program instruction and/or data. The memory 1030 is coupled to the processor 1010. The coupling in this embodiment of this application may be an indirect coupling or a communication connection between apparatuses, units, or modules in an electrical form, a mechanical form, or another form, and is used for information exchange between the apparatuses, the units, or the modules. The processor 1010 may cooperate with the memory 1030. The processor 1010 may execute the program instruction stored in the memory 1030. At least one of the at least one memory may be included in the processor. The processor 1010 may be implemented by using a logic circuit, and a specific form includes but is not limited to any one of the following:

The processor 1010 may be a central processing unit (CPU), a network processor (NP), or a combination of the CPU and the NP. The processor 1010 may be implemented by using a logic circuit. A specific form of the foregoing logic circuit includes but is not limited to any one of the following: a field-programmable gate array (FPGA), a very high speed integrated circuit hardware description language (VHDL) circuit, or a complementary pass transistor logic (CPL) circuit.

When the communication apparatus 1000 is configured to perform an operation performed by the terminal device, the processor 1010 is configured to implement a function of the determining unit 801 and the feedback unit 802. When the communication apparatus 1000 is configured to perform an operation performed by the network device, the processor 1010 is configured to implement a function of the determining unit 901 and the configuration unit 902.

The processor 1010 is further configured to perform other operations and steps performed by the terminal device or the network device in the foregoing method embodiments.

A specific connection medium between the interface circuit 1020, the processor 1010, and the memory 1030 is not limited in this embodiment of this application. In this embodiment of this application, in FIG. 10, the memory 1030, the processor 1010, and the interface circuit 1020 are connected by using a bus. The bus is represented by a bold line in FIG. 10. A manner of connection between other components is merely an example for descriptions, and is not limited thereto. The bus may be classified into an address bus, a data bus, a control bus, and the like. For ease of representation, only one thick line is for representing the bus in FIG. 10, but this does not mean that there is only one bus or only one type of bus.

When the communication apparatus is a chip used in a terminal device, the chip in the terminal device implements the function of the terminal device in the foregoing method embodiments. The chip of the terminal device receives information from another module (for example, a radio frequency module or an antenna) in the terminal device, where the information is sent by a network device to the terminal device; or the chip of the terminal device sends information to another module (for example, a radio frequency module or an antenna) in the terminal device, where the information is sent by the terminal device to a network device.

When the communication apparatus is a module used in a network device, the module in the network device implements the function of the network device in the foregoing method embodiments. The chip in the network device receives information from another module (for example, a radio frequency module or an antenna) in the network device, where the information is sent by a terminal to the network device. Alternatively, the chip in the network device sends information to another module (for example, the radio frequency module or the antenna) in the network device, where the information is sent by the network device to the terminal. The network device module herein may be a baseband chip of the network device, or may be a DU or another module. The DU herein may be a DU in an open radio access network (O-RAN) architecture.

It can be understood that the processor in this embodiment of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general purpose processor may be a microprocessor or any regular processor or the like.

In this embodiment of this application, the memory 1030 may be a nonvolatile memory such as a hard disk drive (HDD) or a solid-state drive (SSD), or may be a volatile memory, for example, a random-access memory (RAM). The memory is any other medium that can carry or store expected program code in a form of instructions or a data structure and that can be accessed by a computer, but is not limited thereto. The memory in this embodiment of this application may alternatively be a circuit or any other apparatus that can implement a storage function, and is configured to store the program instructions and/or the data.

Some or all of the operations and functions performed by the terminal device or the network device described in the foregoing method embodiments of this application may be implemented by using a chip or an integrated circuit.

To implement the functions of the communication apparatus in FIG. 8, FIG. 9, or FIG. 10, an embodiment of this application further provides a chip, including a processor, configured to support the communication apparatus in implementing the functions of the terminal device or the network device in the foregoing method embodiments. In a possible design, the chip is connected to a memory or the chip includes the memory, and the memory is configured to store program instructions and data that are necessary for the communication apparatus.

An embodiment of this application provides a computer-readable storage medium storing a computer program. The computer program includes instructions for performing the foregoing method embodiments.

An embodiment of this application provides a computer program product including instructions. The instructions, when executed on a computer, cause the computer to perform the foregoing method embodiments.

Persons skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Apparently, persons skilled in the art may make various modifications and variations to embodiments of this application without departing from the scope of embodiments of this application. This application is intended to cover these modifications and variations provided that they fall within the scope of protection defined by the following claims and their equivalent technologies.

What is claimed is:
1. A method, comprising:
determining, by a terminal device, N1 hybrid automatic repeat request (HARQ) feedback disabling processes corresponding to a first uplink feedback slot, wherein N1 is a positive integer; and
determining, by the terminal device based on N1 pieces of downlink control information (DCI) corresponding to the N1 HARQ feedback disabling processes, whether to perform HARQ feedback in the first uplink feedback slot, wherein the N1 HARQ feedback disabling processes one-to-one correspond to the N1 pieces of DCI.
2. The method according to claim 1, wherein determining, by the terminal device based on the N1 pieces of DCI corresponding to the N1 HARQ feedback disabling processes, whether to perform HARQ feedback in the first uplink feedback slot comprises:
when a first field in each of the N1 pieces of DCI is a first value, determining, by the terminal device, not to perform HARQ feedback in the first uplink feedback slot.
3. The method according to claim 2, wherein the first field in each of the N1 pieces of DCI is a downlink assignment index (DAI) field, and the first value is 1 for all bits of the respective first field.

4. The method according to claim 2, wherein the first field in each of the N1 pieces of DCI comprises one or more of the following fields:
a new data indicator (NDI), a redundancy version (RV), a transmit power control command for scheduled physical uplink control channel (PUCCH), a PUCCH resource indicator, a physical downlink shared channel (PDSCH) to HARQ feedback timing indicator, or a DAI.
5. The method according to claim 1, wherein determining, by the terminal device based on the N1 pieces of DCI corresponding to the N1 HARQ feedback disabling processes, whether to perform HARQ feedback in the first uplink feedback slot comprises:
when a first field in one or more of the N1 pieces of DCI is not a first value, determining, by the terminal device, to perform HARQ feedback in the first uplink feedback slot.
6. The method according to claim 5, further comprising:
when all received data scheduled by the N1 pieces of DCI is on HARQ feedback disabling processes, determining, by the terminal device, a size of a HARQ codebook based on a sum of change amplitudes of downlink assignment index (DAI) fields in the N1 pieces of DCI; and
performing, by the terminal device, HARQ feedback in the first uplink feedback slot based on the size of the HARQ codebook.
7. The method according to claim 1, wherein the N1 pieces of DCI indicate a quantity N2 of HARQ feedback enabling processes corresponding to the first uplink feedback slot, and N2 is a nonnegative integer; and
wherein:
when a first field in each of the N1 pieces of DCI is the first value, it indicates that N2 is 0; or
when the first field in the one or more of the N1 pieces of DCI is not the first value, it indicates that N2 is greater than 0.
8. A method, comprising:
determining, by a network device, M hybrid automatic repeat request (HARQ) feedback disabling processes corresponding to a first uplink feedback slot, wherein M is a positive integer; and
configuring, by the network device, M pieces of downlink control information (DCI) corresponding to the M HARQ feedback disabling processes, wherein the M pieces of DCI indicate whether to perform HARQ feedback in the first uplink feedback slot, and the M HARQ feedback disabling processes one-to-one correspond to the M pieces of DCI.
9. The method according to claim 8, wherein configuring, by the network device, the M pieces of DCI corresponding to the M HARQ feedback disabling processes comprises:
when a quantity N2 of HARQ feedback enabling processes corresponding to the first uplink feedback slot is 0, setting a first field in each of the M pieces of DCI to a first value; or
when a quantity N2 of HARQ feedback enabling processes corresponding to the first uplink feedback slot is 0, setting a first field in one or more of the M pieces of DCI to be other than a first value.
10. The method according to claim 9, wherein:
the first field in each of the M pieces of DCI being the first value indicates to a terminal device not to perform HARQ feedback in the first uplink feedback slot; and the first field in the one or more of the M pieces of DCI not being the first value indicates to the terminal device to perform HARQ feedback in the first uplink feedback slot.

11. The method according to claim 9, wherein the first field in each of the M pieces of DCI is a downlink assignment index (DAI) field, and the first value is 1 for all bits of the respective first field.

12. The method according to claim 9, wherein the first field in each of the M pieces of DCI comprises one or more of the following fields:

a new data indicator (NDI), a redundancy version (RV), a transmit power control command for scheduled physical uplink control channel (PUCCH), a PUCCH resource indicator, physical downlink shared channel (PDSCH) to HARQ feedback timing indicator, or a downlink assignment index (DAI).

13. An apparatus, comprising:

an interface circuit; and a processor, wherein the processor and the interface circuit are coupled to each other, the processor is configured to:

determine N1 hybrid automatic repeat request (HARQ) feedback disabling processes corresponding to a first uplink feedback slot, wherein N1 is a positive integer; and determine, based on N1 pieces of downlink control information (DCI) corresponding to the N1 HARQ feedback disabling processes, whether to perform HARQ feedback in the first uplink feedback slot, wherein the N1 HARQ feedback disabling processes one-to-one correspond to the N1 pieces of DCI.

14. The apparatus according to claim 13, wherein determining, based on the N1 pieces of DCI corresponding to the N1 HARQ feedback disabling processes, whether to perform HARQ feedback in the first uplink feedback slot comprises:

when a first field in each of the N1 pieces of DCI is a first value, determining not to perform HARQ feedback in the first uplink feedback slot.

15. The apparatus according to claim 14, wherein the first field in each of the N1 pieces of DCI is a downlink assignment index (DAI) field, and the first value is 1 for all bits of the respective first field.

16. The apparatus according to claim 14, wherein the first field in each of the N1 pieces of DCI comprises one or more of the following fields:

a new data indicator (NDI), a redundancy version (RV), a transmit power control command for scheduled physical uplink control channel (PUCCH), a PUCCH resource indicator, a physical downlink shared channel (PDSCH) to HARQ feedback timing indicator, or a downlink assignment index (DAI).

17. The apparatus according to claim 13, wherein determining, based on the N1 pieces of DCI corresponding to the N1 HARQ feedback disabling processes, whether to perform HARQ feedback in the first uplink feedback slot comprises:

when a first field in one or more of the N1 pieces of DCI is not a first value, determining to perform HARQ feedback in the first uplink feedback slot.

18. The apparatus according to claim 17, wherein the processor is further configured to:

when all received data scheduled by the N1 pieces of DCI is on HARQ feedback disabling processes, determining a size of a HARQ codebook based on a sum of change amplitudes of downlink assignment index (DAI) fields in the N1 pieces of DCI; and performing HARQ feedback in the first uplink feedback slot based on the size of the HARQ codebook.

19. The apparatus according to claim 13, wherein the N1 pieces of DCI indicate a quantity N2 of HARQ feedback enabling processes corresponding to the first uplink feedback slot, and N2 is a nonnegative integer; and wherein:

when a first field in each of the N1 pieces of DCI is a first value, it indicates that N2 is 0; or when the first field in the one or more of the N1 pieces of DCI is not the first value, it indicates that N2 is greater than 0.

* * * * *